United States Patent
Amanai

(10) Patent No.: US 6,903,883 B2
(45) Date of Patent: Jun. 7, 2005

(54) IMAGE PICKUP LENS UNIT AND IMAGE PICKUP DEVICE

(75) Inventor: Takahiro Amanai, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/602,874

(22) Filed: Jun. 25, 2003

(65) Prior Publication Data

US 2005/0030647 A1 Feb. 10, 2005

(30) Foreign Application Priority Data

Jun. 27, 2002 (JP) .................................... P2002-188301

(51) Int. Cl.⁷ ................................................ G02B 7/02
(52) U.S. Cl. ...................... 359/819; 359/811; 359/823; 359/824
(58) Field of Search ................................ 359/819, 811, 359/619, 621, 823, 824, 814; 353/100; 362/455; 396/526

(56) References Cited

U.S. PATENT DOCUMENTS

| | | | | |
|---|---|---|---|---|
| 5,151,790 A | * | 9/1992 | Takatori et al. ............. | 348/335 |
| 6,324,010 B1 | * | 11/2001 | Bowen et al. .............. | 359/622 |
| 6,373,635 B1 | * | 4/2002 | Fujimoto et al. ........... | 359/619 |
| 6,707,613 B2 | * | 3/2004 | Fujimoto et al. ........... | 359/622 |
| 2001/0038500 A1 | * | 11/2001 | Shibazaki ................... | 359/823 |
| 2003/0128442 A1 | * | 7/2003 | Tanaka et al. .............. | 359/819 |
| 2003/0179457 A1 | * | 9/2003 | Dobashi et al. ............. | 359/619 |
| 2004/0047274 A1 | * | 3/2004 | Amanai ...................... | 369/125 |

FOREIGN PATENT DOCUMENTS

| | | |
|---|---|---|
| JP | 4-097110 | 3/1992 |
| JP | 7-209714 | 8/1995 |

* cited by examiner

Primary Examiner—Ricky Mack
Assistant Examiner—Brandi N Thomas
(74) Attorney, Agent, or Firm—Kenyon & Kenyon

(57) ABSTRACT

Lenses 11, 12, and 13 having a power are layered in an optical axis direction such that flange section 11d and 12d are cemented so as to form an air interval between the lens 11 and the lens 12. A space between the lens 12 and the lens 13 are cemented together. A preferable interval is disposed in the optical axis direction by a positioning section which is disposed in each flange section.

By doing this possible to provide a compact image pickup lens unit which can be used in an image pickup device having a superior performance by a cheap cost.

7 Claims, 26 Drawing Sheets

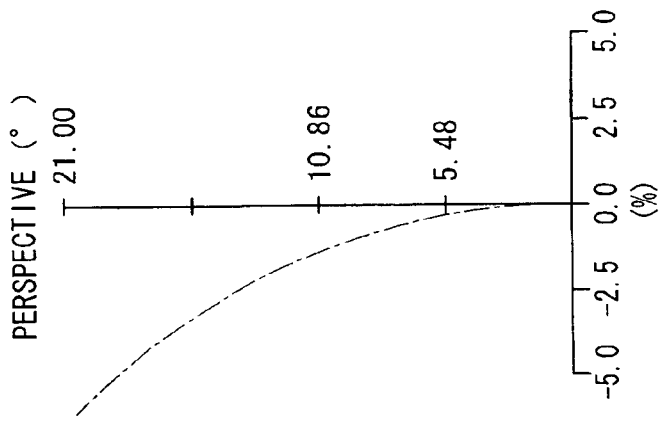
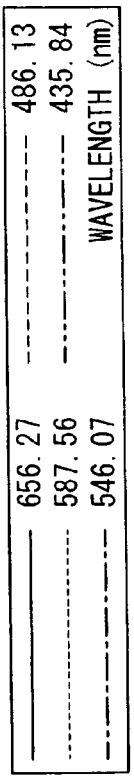
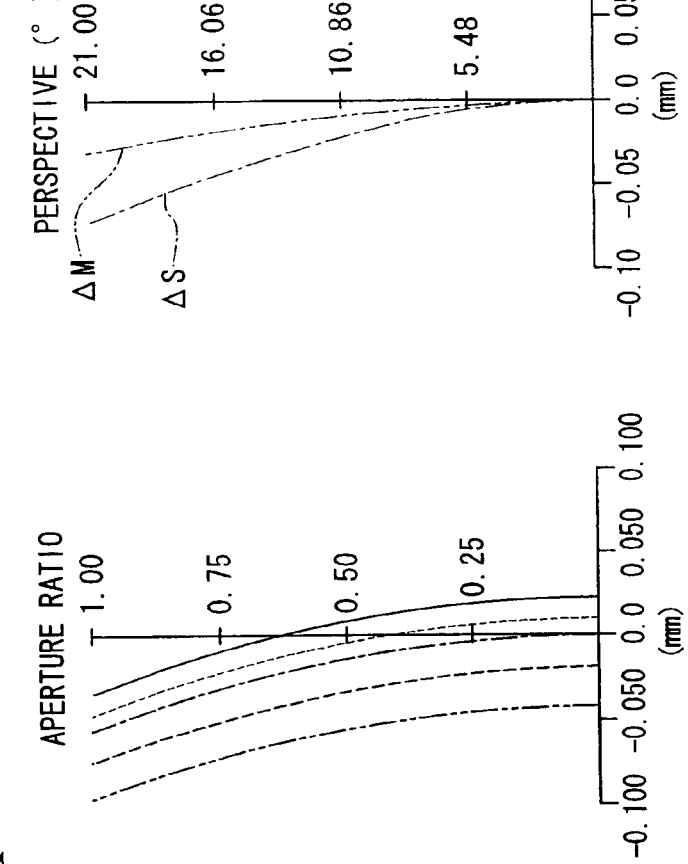
FIG. 9A SPHERICAL ABERRATION
FIG. 9B ASTIGMATISM
FIG. 9C DISTORTION

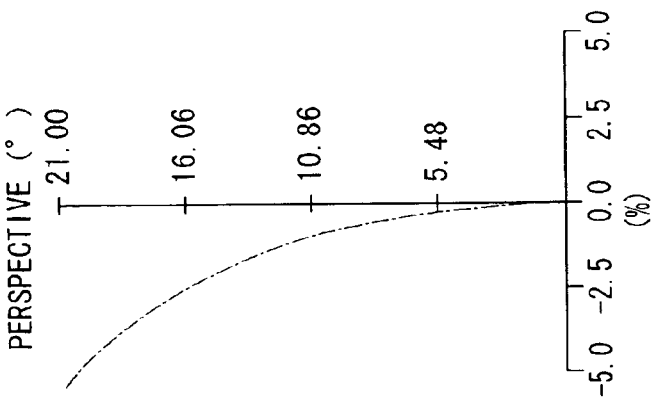
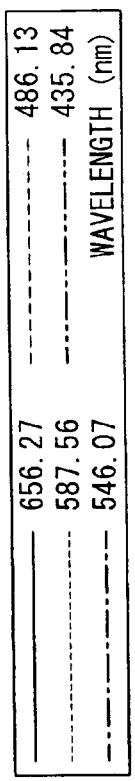
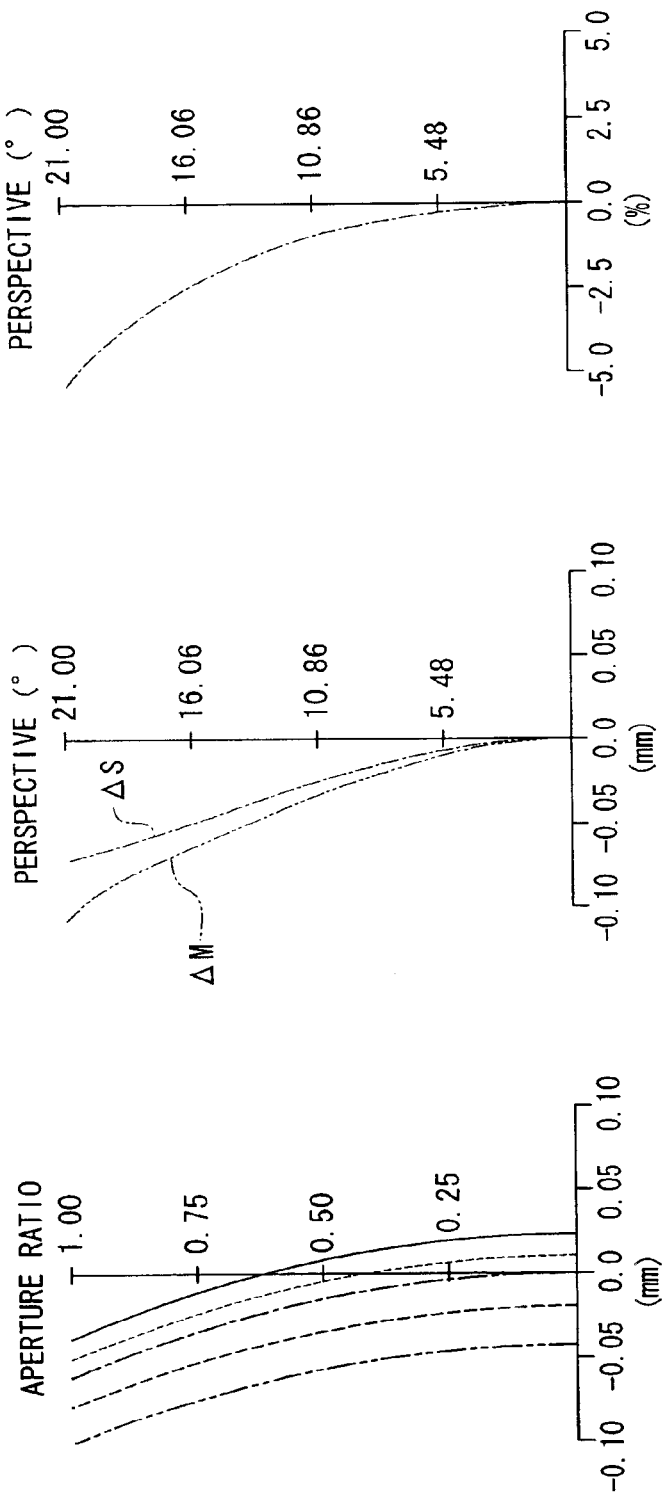
FIG. 12A SPHERICAL ABERRATION  FIG. 12B ASTIGMATISM  FIG. 12C DISTORTION

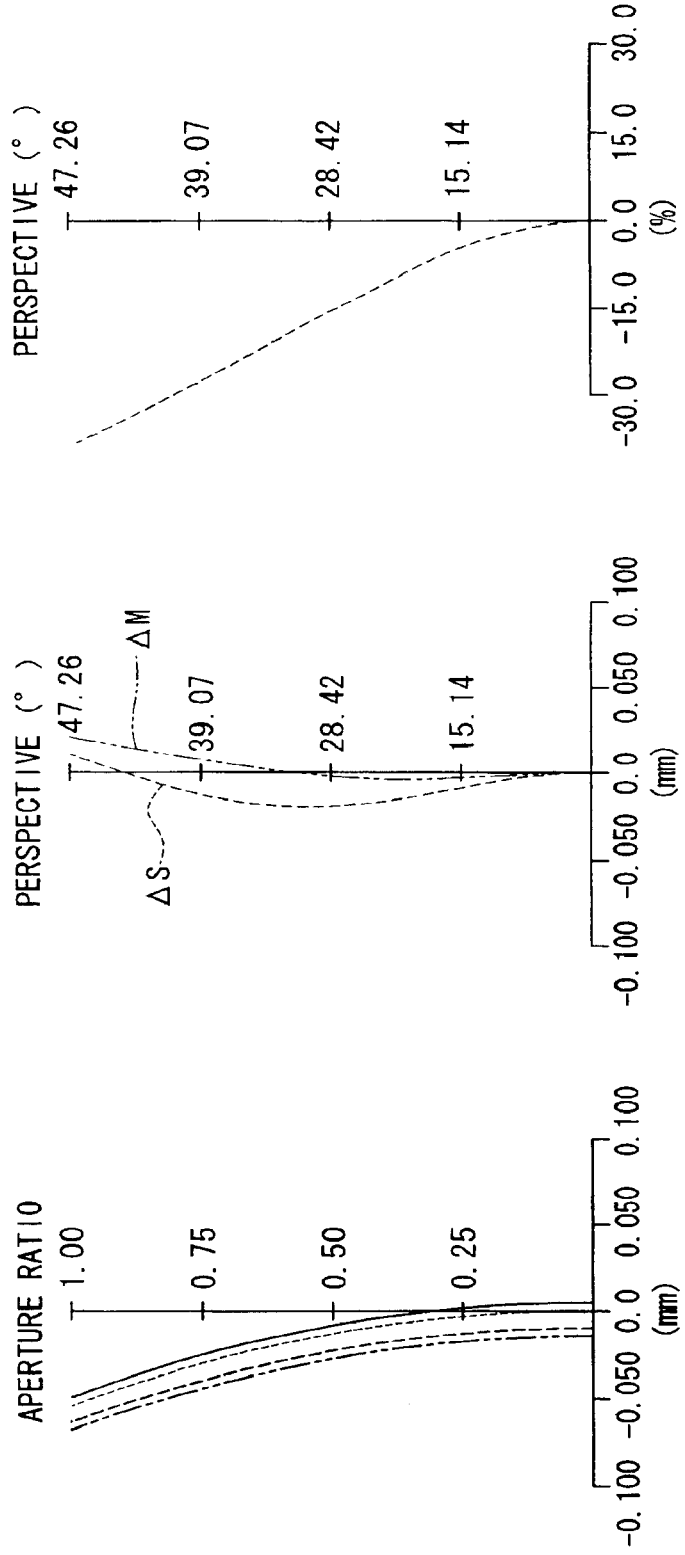
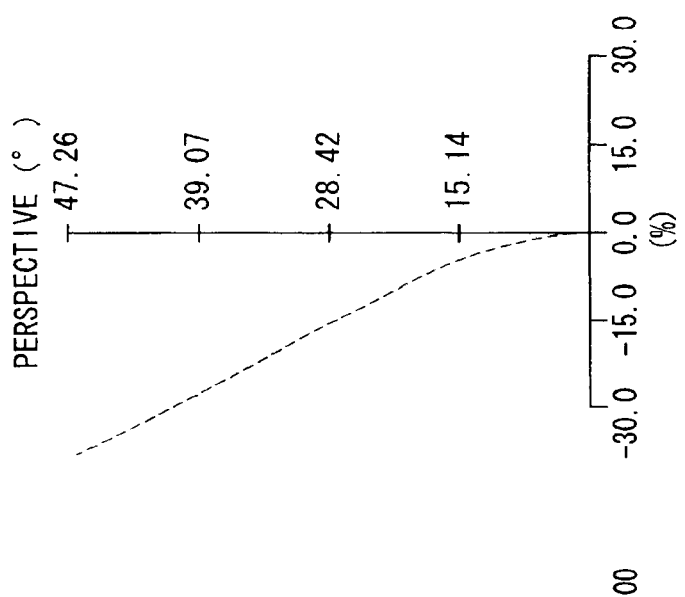
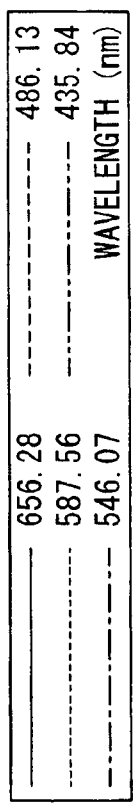
FIG. 14A SPHERICAL ABERRATION   FIG. 14B ASTIGMATISM   FIG. 14C DISTORTION

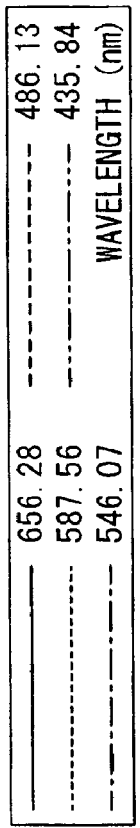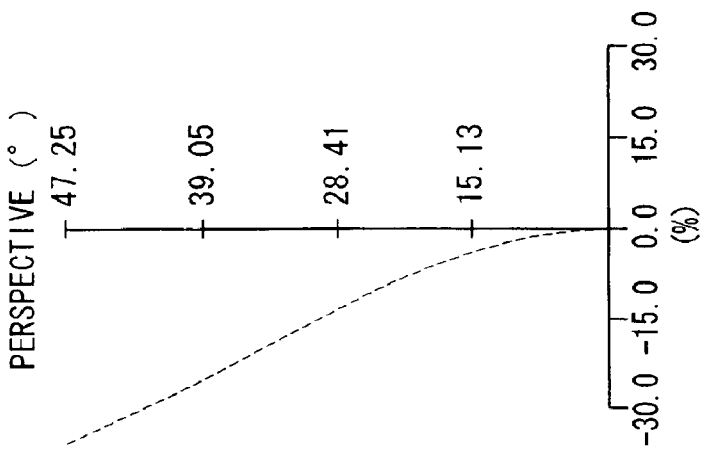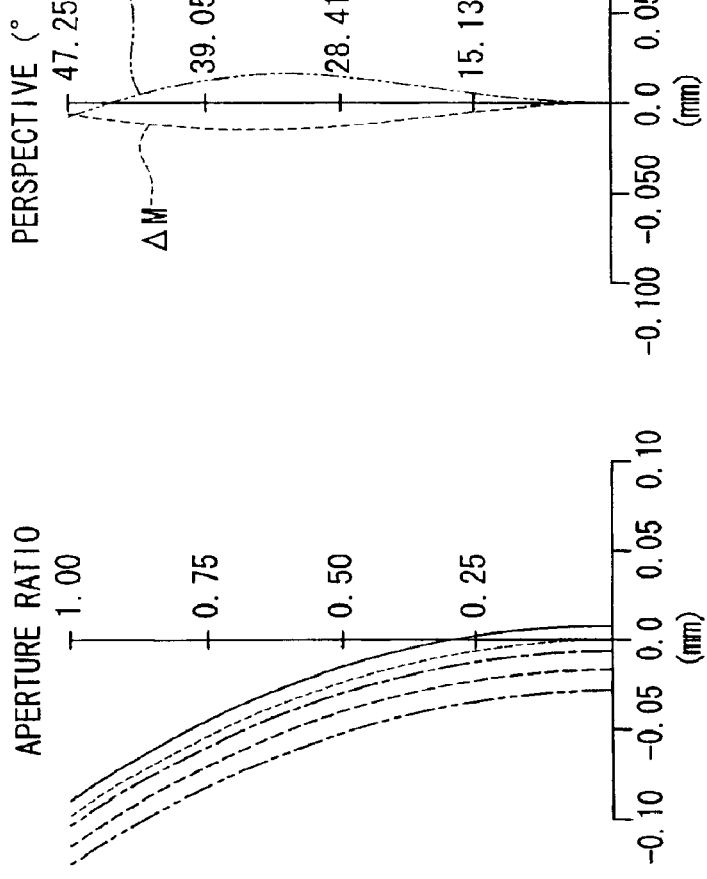
FIG. 16A SPHERICAL ABERRATION   FIG. 16B ASTIGMATISM   FIG. 16C DISTORTION

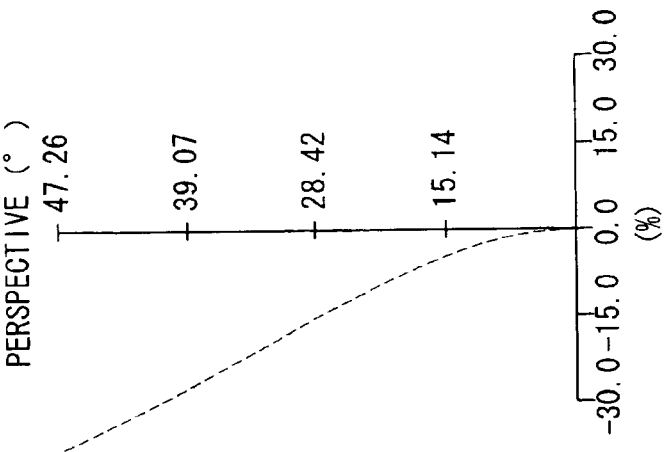
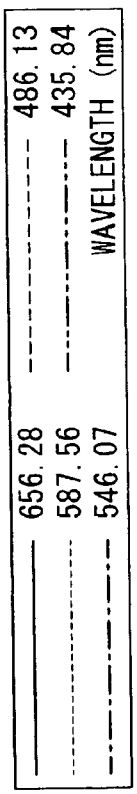
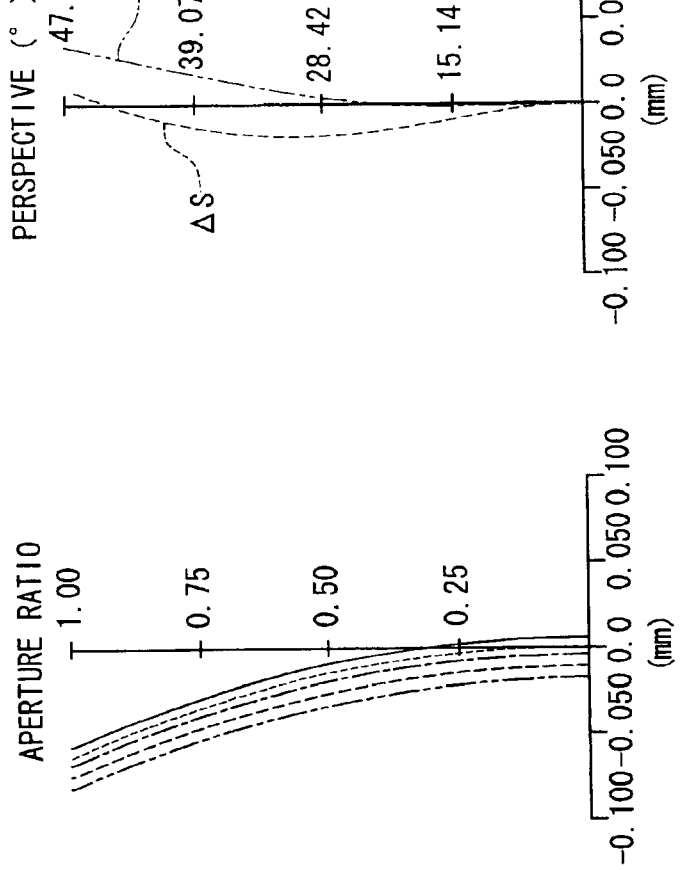
FIG. 18A SPHERICAL ABERRATION  FIG. 18B ASTIGMATISM  FIG. 18C DISTORTION

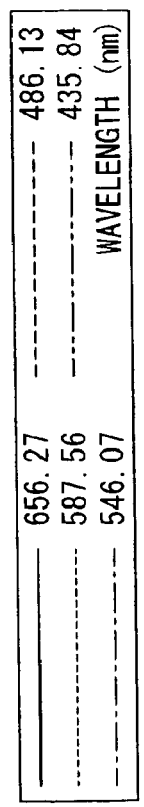
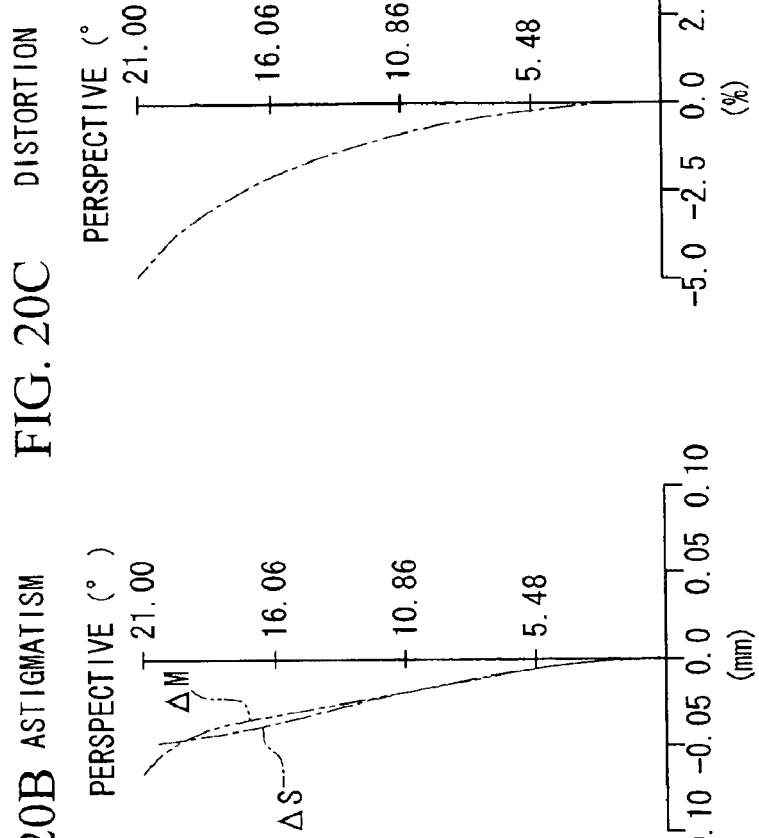
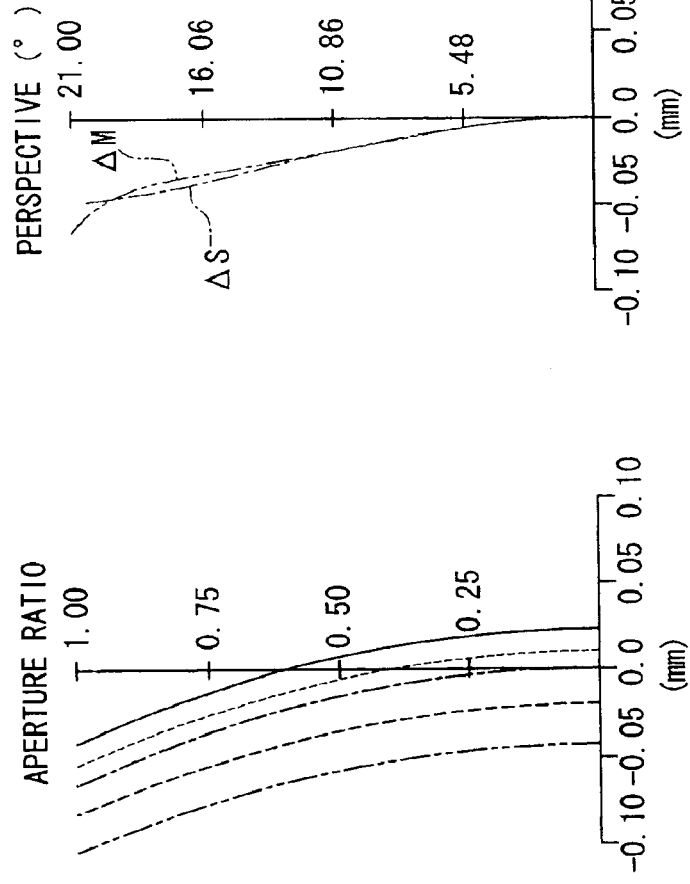
FIG. 20A SPHERICAL ABERRATION  FIG. 20B ASTIGMATISM  FIG. 20C DISTORTION

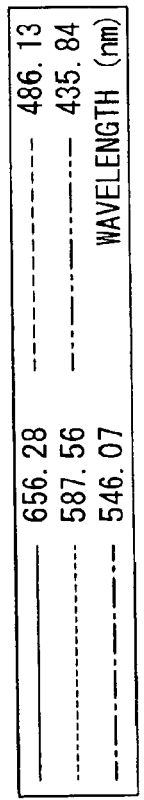
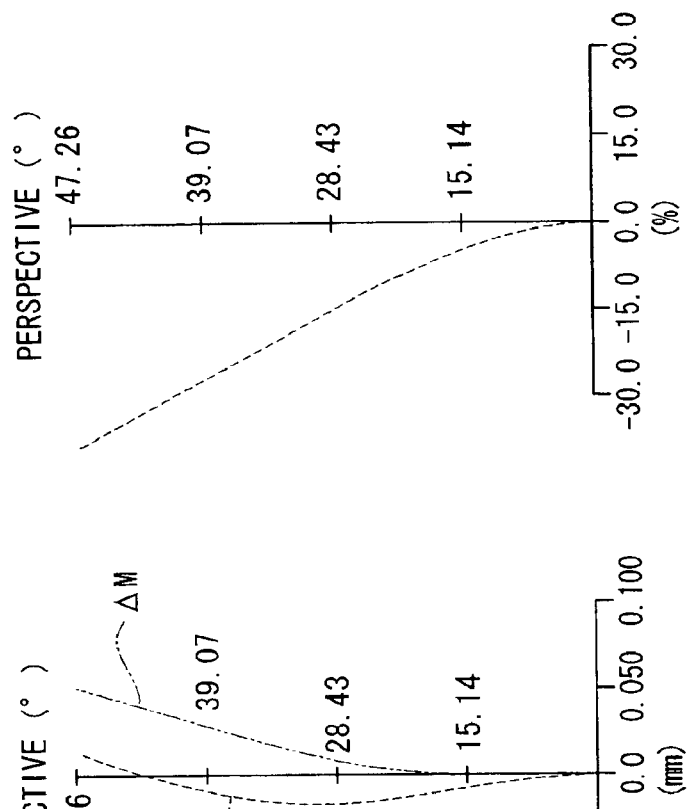
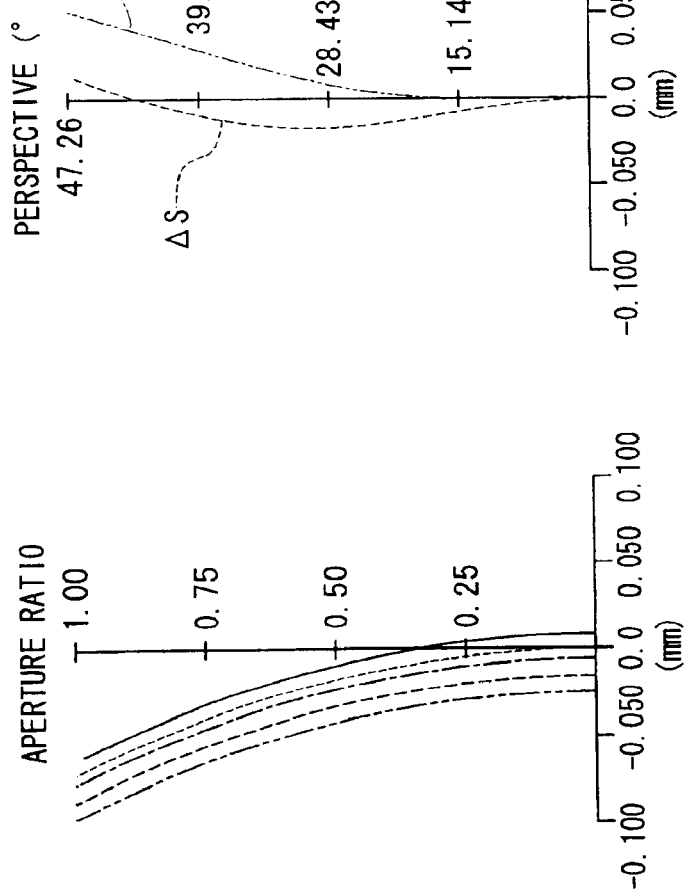
FIG. 22A SPHERICAL ABERRATION  FIG. 22B ASTIGMATISM  FIG. 22C DISTORTION

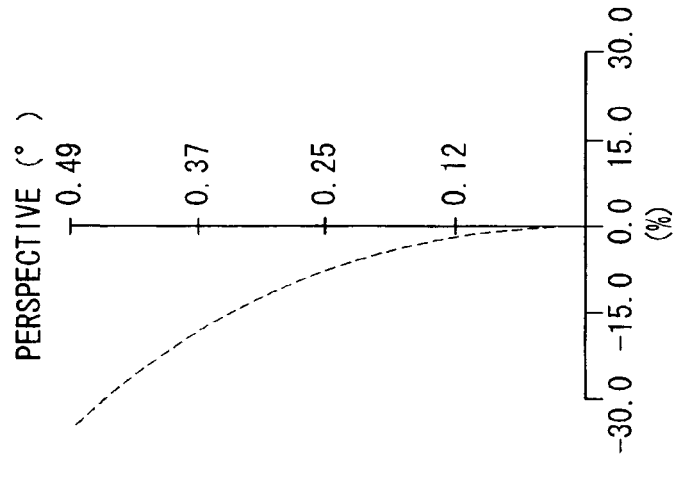
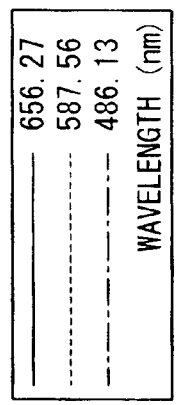
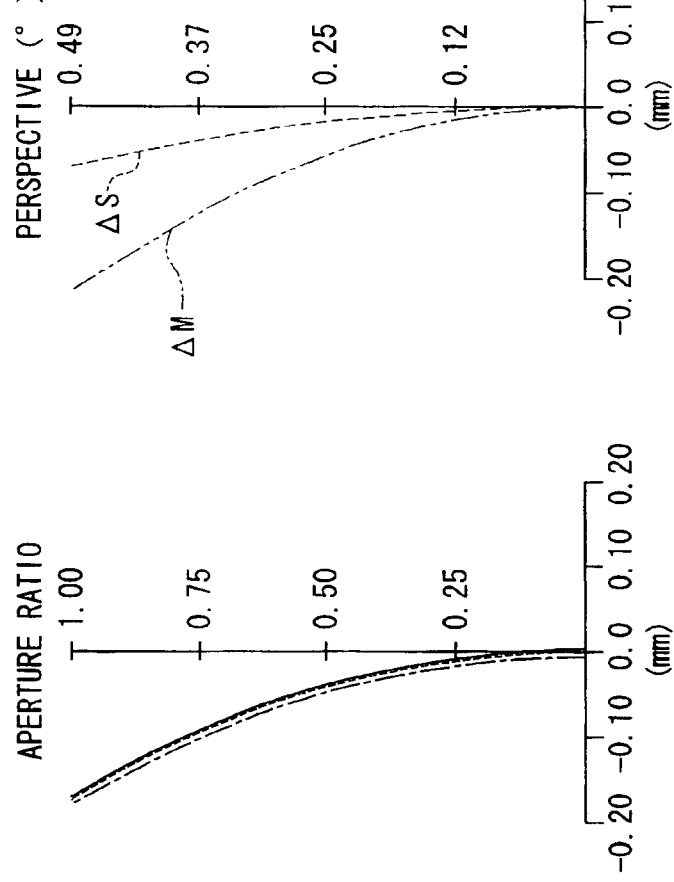
FIG. 24A SPHERICAL ABERRATION   FIG. 24B ASTIGMATISM   FIG. 24C DISTORTION

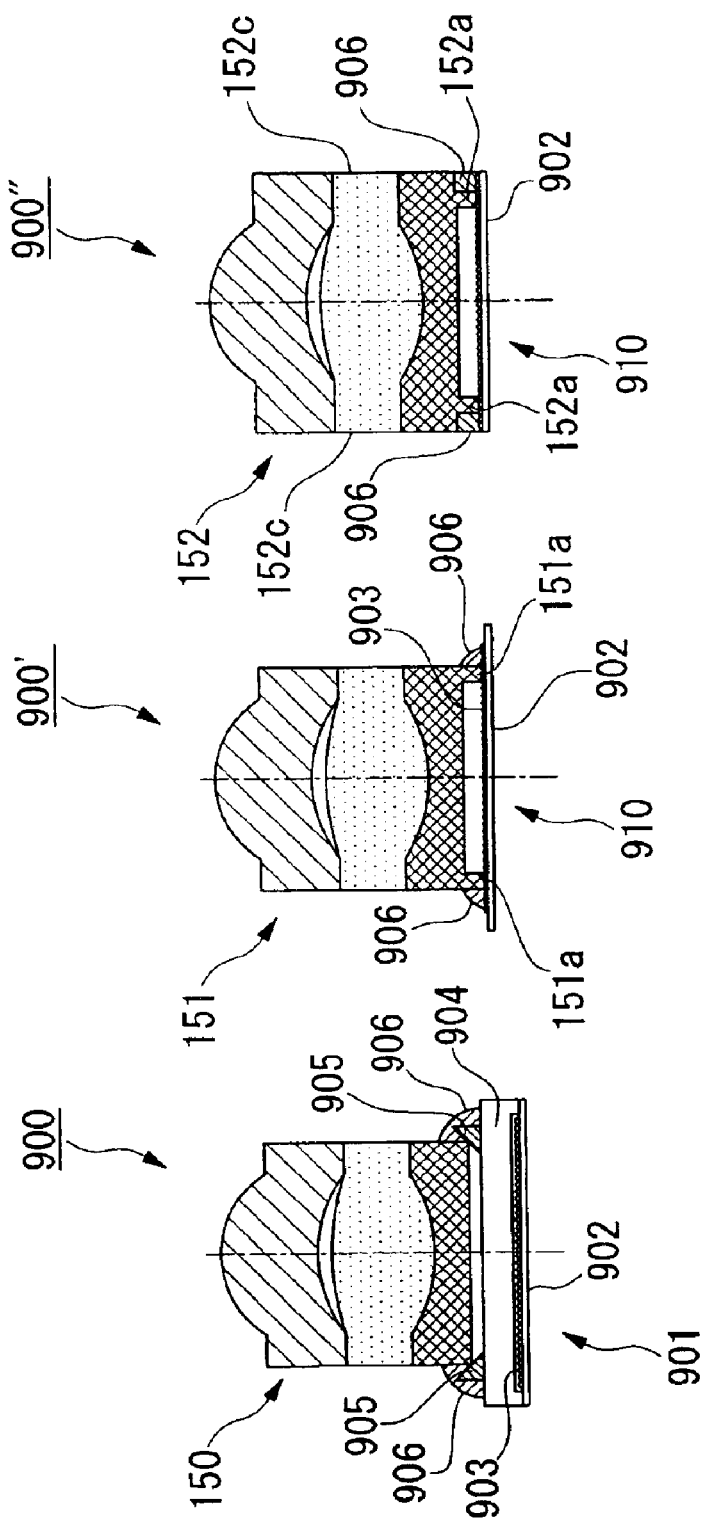

IMAGE PICKUP LENS UNIT AND IMAGE PICKUP DEVICE

INCORPORATED BY REFERENCE

The present application is based on patent application No. 2002-188301 filed in Japan, the content of which is incorporated herein by reference.

BACKGROUND OF THE INVENTION

1. Field of the Invention

The present invention relates to an image pickup lens unit and an image pickup device.

2. Description of Related Art

Conventionally, in an image pickup lens unit using a plurality of lenses such as lenese in a camera, lenses are ground or formed and the lenses are disposed in a lens housing made of, for example, a metal member which is precisely formed. After that, the alignment of the lenses is adjusted mutually so as to be fixed. In contrast, in a Japanese Unexamined Patent Application, First Publication No. Hei 4-97110 and Japanese Unexamined Patent Application, First Publication No. Hei 7-209714, an image pickup lens unit and an image pickup device using therefore are disclosed in which a lens supporting member having a cylindrical frame is formed in a molding process by using a synthetic resin member so as to reduce members for the lens supporting member.

SUMMARY OF THE INVENTION

In a first aspect of the present invention, an image pickup lens unit comprises at least three optical elements having at least an air interval for forming an air lens. Also, the optical elements are formed unitarily wherein the optical elements are cemented mutually between the other optical elements which neighbors in an optical axis or between sandwiching members which are disposed between the other optical elements.

BRIEF DESCRIPTION OF THE DRAWINGS

FIGS. 9A to 9C show aberration in a first data example.

FIGS. 12A to 12C show aberration in a second data example.

FIGS. 14A to 14C show aberration in a third data example.

FIGS. 16A to 16C show aberration in a fourth data example.

FIGS. 18A to 18C show aberration in a fifth data example.

FIGS. 20A to 20C show aberration in a sixth data example.

FIGS. 22A to 22C show aberration in a seventh data example.

FIGS. 24A to 24C show aberration in an eighth data example.

FIGS. 26A to 26C are cross sections in an optical axis direction for showing a general structure of an image pickup unit which is a main part of an image pickup device which is other example of an image pickup device according to the second embodiment of the present invention.

DETAILED DESCRIPTION OF THE INVENTION

An image pickup lens unit and an image pickup device according to embodiments in the present invention are explained with reference to the cemented drawings as follows.

First Embodiment

Figure 1A:
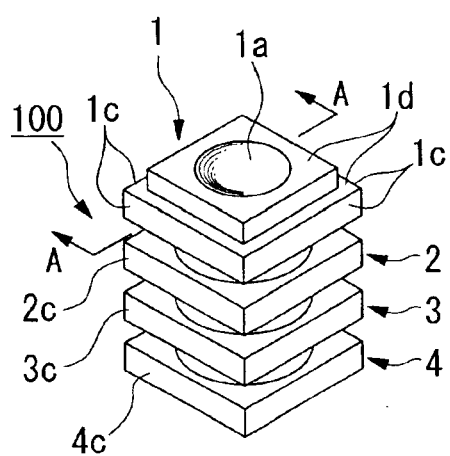
FIG. 1A is a perspective view of an image pickup lens unit according to a first embodiment of the present invention.
Figure 1B:
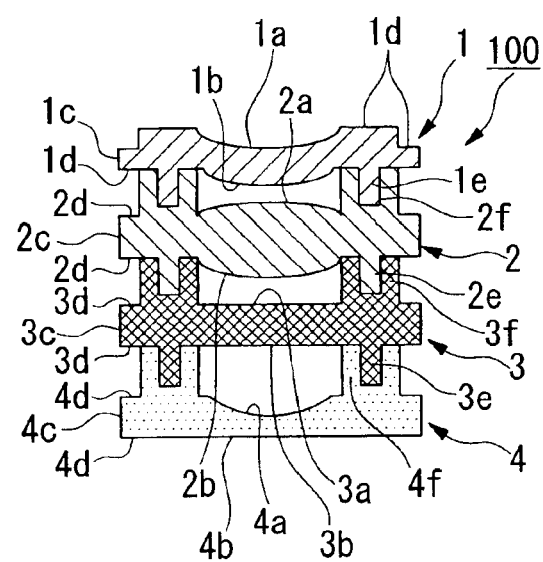
FIG. 1B is a cross section viewed in a line A—A in FIG. 1A.

First, an image pickup lens unit according to a first embodiment in the present invention is explained. FIG. 1A is a perspective view for explaining a general structure of an image pickup lens unit 100 according to the present embodiment. FIG. 1B is a cross section viewed in a line A—A in FIG. 1A.

The image pickup lens unit 100 has three lenses such as a lens 1, 2, and 4 and an optical filter 3. The three lenses 1, 2, and 4 are disposed so as to overlap each other such that the optical axes of these lenses are aligned. The optical filter 3 has a filter surface which does not have an optical power. An optical filter 3 (optical filter member) is disposed between the lenses 2 and 4 as an optical element. These optical elements, lenses and optical filter are formed unitarily. In this case, an optical element is cemented with adjacent optical element in the optical axis direction.

In a central part of the lens 1, a lens surface 1a and a lens surface 1b which is formed in a convex surface are provided. A flange section 1d is disposed on an outer periphery of the lens 1. This flange section expands in a direction orthogonal to optical axes of the lens surfaces 1a and 1b. An outer periphery of the flange section 1d is formed in an approximate square in a plan view. The flange section 1d is provided with a flange side surface 1c (side surface) which is approximately parallel with an optical axis. Also, a plurality of cylindrical positioning protruding sections are disposed on a surface of the flange section 1d which faces to the lens 2. The position protruding section 1e is a cylindrical shape and has a rectangular cross section.

The lens 2, the optical filter 3, and the lens 4 are provided with flange sections 2d, 3d, and 4d respectively similarly with the lens 1. The lens 2, the optical filter 3, and the lens 4 are provided with four flange side surfaces 2c, 3c, and 4c (side surfaces) respectively. Each surface of the flange side surfaces 1c, 2c, 3c, and 4c are disposed in the same direction. And the flange side surfaces 1c, 2c, 3c, and 4c are disposed (contacted) in the same flat surface in the optical axis direction respectively. Here, outer peripheries of the flange sections 1d, 2d, 3d, and 4d are formed to have spaces therebetween in the optical axes under condition that the flange sections are disposed so as to overlap each other.

Also, the lens 2, the optical filter 3, and the lens 4 are provided with optical surfaces. The lens 2 has a lens surfaces 2a and 2b. The optical filter 3 has a filter surfaces 3a and 3b of which surfaces are treated so as to work as optical filters. The lens 4 has a concave lens surface 4a and a flat lens surface 4b. Therefore, the lenses 1 and 2 are positive lenses which have a positive power. The lens 4 is a negative lens which has a negative power.

Also, the positioning grooves 2f which are formed in a concave groove are disposed on the flange section 2d which faces to the lens 1. The number of positioning grooves 2f is equal that of positioning protruding section 1e. A positioning section is formed by these positioning protruding sections 1e and the positioning grooves 2f. The positioning protruding sections 1e and the positioning grooves 2f are formed so as to fit each other without clearance in a direction orthogonal to the optical axis where the optical axis of the lens 1 and the optical axis of the lens 2 coincides.

Also, a surface on a tip of the positioning groove 2f in the optical axis direction is formed so as to contact the flange section 1d. By doing this, the lens 1 and the lens 2 are positioned precisely in the optical axis direction under condition that an air interval is formed between the lens surface 1b and the lens surface 2a. This air interval is formed between the lens surfaces 1b and 2a which have power; thus, this air interval works as an air lens which has a power.

Similarly, positioning sections such as a positioning protruding section 2e, a positioning groove 3f, a positioning protruding section 3e, and a positioning groove 4f are formed on the flange section 2d which faces to the lens 3, on the flange section 3d which faces to the lens 2, on the flange section 3d which faces to the lens 4, and on the flange section 4d which faces to the optical filter 3 respectively. These positioning sections are disposed such that optical axes of them are aligned and appropriate air intervals are formed among the optical surfaces of the optical elements.

Here, examples of shape of the positioning sections are illustrated in FIGS. 1A to 1B. In FIGS. 1A and 1B, the shape was illustrated in a deformed manner so as to help understanding of the structure of the present invention. However, the size and shape of the positioning sections in the present invention are not limited in such a structure as long as it is possible to regulate the position of these positioning sections in an optical axis direction and in a direction orthogonal to the optical axis. For example, it is in a form of a V-shape protruding section and a V-shape groove, in a form of a pin and a pinhole, or in a form of a ball and a ball hole. Positioning sections having a fitting structure may be other than a positioning protruding section 1e and a positioning groove 2f shown in FIG. 1B. Also, it may be possible that a protruding sections having reference surfaces in a positioning direction are formed. By doing this, it is possible to position by pushing the reference surfaces each other.

For a method for cementing the lenses 1 and 2, the optical filter 3, and the lens 4, it is possible to use various methods preferably. For example, a method using a bonding agent such as an UV (ultra-violet) ray-curable resin and a method using a laser melting theory can be used.

The optical elements can be manufactured by forming a glass material or a synthetic resin in a mold. In particular, it is preferable to use a glass material because more stable optical characteristics and small size advantage are necessary in the optical element having an optical power. It is because a glass material has a greater refractive index with superior optical characteristics such as flatness, uniformity, and stability to a change in temperature.

Figure 2:
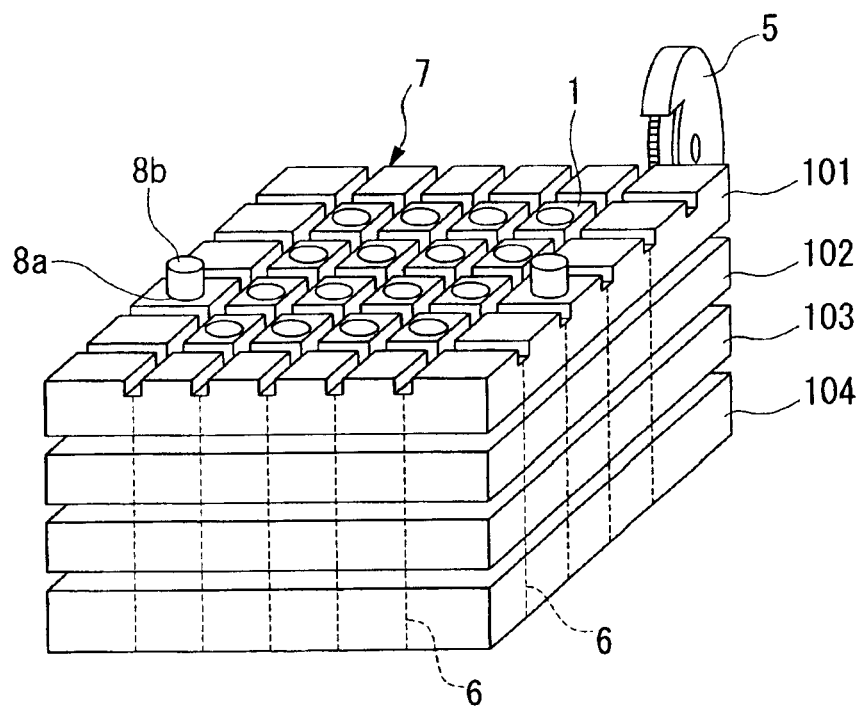
FIG. 2 is a perspective view showing approximately an example of a method for producing the image pickup lens unit according to the first embodiment in the present invention.

The image pickup lens unit 100 is manufactured as follows. First, preparing arrays 101, 102, 103 and 104 (optical element arrays). The arrays 101, 102, 103, 1 and 104 have the lens 1, the lens 2, the optical filter 3, and the lens 4 respectively. Simultaneously, a positioning protrusion and a positioning groove are formed. Next, these arrays are piled up so that the optical axes of these arrays are aligned and the arrays are positioned so as to be cemented together. As shown in FIG. 2, under such a condition, the arrays are cut along a cutting line 6 by a cutting device such as a cutter 5. In such a case, shapes of the flange side surfaces 1c, 2c, 3,c and 4c are formed along the cutting line 6. However, there is a case in which the surface is not parallel with the optical axis occasionally. Here it may be possible that the surface finish of the flange side surfaces 1c, 2c, 3c, and 4c are performed by, for example, a lapping process after cutting according to necessity.

Here, the arrays 101, 102, 103, and 104 are positioned in a direction orthogonal to the optical axis by disposing at least two positioning holes 8a and putting positioning pins 8b therethrough. Also, for example, the arrays 101, 102, 103, and 104 may be positioned by using a fixture which can retain the arrays 101, 102, 103, and 104 movably in a direction orthogonal to the optical axis.

Here, it is preferable that light absorbing sections are disposed on non-optical surfaces in the image pickup lens unit 100. For example, non-optical surface is the flange sections 1d, 2d, 3d, and 4d and the flange side surfaces 1c, 2c, 3c, and 4c. The light absorbing section is formed by a method such as painting method and a vapor disposition method. In particular, it may be possible that light absorbing sections are disposed on the flange side surfaces 1c, 2c, 3c, and 4c by rolling a film member having a light-absorbing characteristics on these surfaces and fix there. In such a case, it may be possible to dispose and fix a non-contractive film member such as a rubber member or a thermally-contracting tube thereon. Also, it may be possible to roll and fix a non-contractive film member such as a paper and a synthetic resin on the flange surfaces 1c, 2c, 3c, and 4c by using a bonding agent or an adhesive member.

Next, function of the image pickup lens unit 100 according to the present embodiment is explained.

In the image pickup lens unit 100 according to the present embodiment, optical elements such as lenses 1, 2, and 4, and an optical filter 3 are positioned and cemented with neighboring optical elements in an optical axis direction. Therefore, members for cementing and retaining the optical elements such as a lens barrel are not necessary. As a result, it is possible to reduce a the number of such members; thus, it is possible to reduce the production cost. Simultaneously, there is an advantage in that it is possible to make the image pickup lens unit 100 in a lighter weight and smaller size. Also, according to the present invention, it is possible to form an optical filter member unitarily with the image pickup lens unit; thus, it is possible to improve the function of the image pickup lens unit and make the image pickup lens unit in a smaller size. Also, it is possible to cement the optical filter member with the other optical members by similar manufacturing processes; thus, it is possible to simplify the manufacturing processes and improve the productivity.

Also, in the present embodiment, a positioning section in the optical axis direction is disposed on the flange sections 1d, 2d, 3d, and 4d as an outer periphery section of the optical surface unitarily; therefore, it is possible to form inaccuracy caused by cementing a plurality of members; thus, it is possible to form the air intervals highly accurately. Also, a refractive surfaces having the air surfaces have a larger power than in the cemented surface of the cemented lens having less refractive index difference; thus, if the number of optical elements are equal, it is possible to realize higher optical characteristics by forming the large air intervals than in a case (including a case in which there is no air interval) that an air interval is narrow.

Also, in the present embodiment, the optical elements are disposed on the flange sections 1d, 2d, 3d, and 4d in a peripheral section of the optical surface; therefore, it is possible to form positioning sections on the flange sections 1d, 2d, 3d, and 4d. Also, it is possible to use the flange sections as cementing surfaces. By doing this, there is no concern that the optical surfaces are damaged or polluted; therefore, there is an advantage in that production efficiency improves.

Also, protruding sections are formed on outer peripheral sections of the flange sections 1d, 2d, 3d, and 4d so as to be disposed toward thereoutside. The protruding sections is formed such that spaces are formed in an optical axis direction when other optical elements are disposed on the protruding sections. By doing this, it is possible to use such spaces as a relief for the bonding agent or cutting tip which is produced in a metal-cutting operation.

As explained above, the image pickup lens unit 100 according to the present embodiment is provided with the flange side surfaces 1c, 2c, 3c, and 4c which are disposed on the flange sections 1d, 2d, 3d, and 4d in the peripheral sections of the optical elements. The flange side surfaces 1c, 2c, 3c, and 4c are aligned on surfaces of a prismatic column which is approximately parallel with the optical axis. Therefore, it is possible to use the flange surfaces for a cementing surface. Also, as explained above, the image pickup lens unit 100 according to the present embodiment is produced by piling up the optical element arrays and cutting the cemented optical element arrays by a cutter 5. By doing this, the positioning and cemented process of the optical element arrays which include a lot of optical elements are performed in one time. As a result, it is easy to fix the positioning relationship. Therefore, there is an advantage in that it is possible to improve the productivity greatly than in a case in which a lot of optical elements are positioned and cemented independently. Such an advantage is more conspicuous when optical elements are small; thus, it is suitable for a mass production of a small image pickup lens unit.

Here, in the present embodiment, a case in which three optical elements which have power is explained. More importantly, it is possible to improve the optical characteristics by increasing the optical elements. In such a case, it is possible to correct the aberrations by providing at least one positive lens and at least on negative lens there.

Also, it is preferable that no more than 10 optical elements having a power are disposed. By doing this, it is possible to prevent excessive alignment error which is caused in machining process for the positioning section and an assembling processes for the optical elements. Also, it is more preferable that no more than eight optical elements having a power are disposed. It is further preferable that no more than seven optical elements having a power are disposed. It is possible to determine the number of the optical elements according to a relationship of a required characteristics for the image pickup lens unit 100 and the production cost.

Here, in the above explanation, there is no limitation for an air interval. However, it is preferable to limit the air intervals. By limiting the air intervals in an appropriate distance, the length of the positioning section in the optical axis direction becomes short; thus, it is possible to perform a machining operation in superior accuracy easily. As a result, it is possible to prevent inaccurate alignment.

More specifically, it is preferable that the image pickup lens unit can satisfy following conditions such as $$ST/TD<0.7 \qquad \text{(condition 1) and}$$

$$MT/TD<0.5 \qquad \text{(condition 2)}$$

where TD is defined as a surface interval (total length of the optical system) on the optical axis from a first surface of the optical system which is formed by the optical elements are cemented together to the last surface of the optical system, ST is defined as a total length of the air intervals on the optical axis (total air intervals), and MT is defined as a maximum value of the length of the air intervals on the optical axis (maximum air interval). At the above conditions, value of ST/TD or MT/TD exceed the uper limit, the air interval or the total length of the optical system become longer; thus, alignment error becomes larger. As a result, it is difficult to realize a sufficient optical characteristics.

Also, it is preferable that following conditions 3 and 4 are satisfied instead of the condition 1 and 2 if it is satisfied, it is possible to further improve the accuracy in assembly and machining operation for the optical elements.

$ST/TD<0.6$ (condition 3)

$MT/TD<0.4$ (condition 4)

In order to further improve the accuracy in assembly and machining operation for the optical elements, it is preferable that following conditions 5 and 6 are satisficed instead of the conditions 1 and 2.

$ST/TD<0.5$ (condition 5)

$MT/TD<0.3$ (condition 6)

Furthermore, in the above embodiment, explanation was made for a case in which eight air surfaces for the optical elements are disposed. However, it is possible that the air surfaces are limited. By doing this, it is possible to reduce a stray light which easily occurs on the air surfaces. As a result, it is possible to prevent a ghost image and a flare; thus, it is possible to improve the quality of the image. Also, it is possible to remove the optical surfaces which must be coated so as to be anti-reflection or reduce such optical surfaces. Thus, it is possible to realize low production cost.

Therefore, it is preferable that the air surfaces be no more than ten optical surfaces.

For the purpose of reducing more stray lights, it is preferable that no more than eight air surfaces are provided. It is further preferable that no more than six air surfaces are provided for that purpose.

Also, the above embodiment is explained by a case in which there is no particular limitation on a shape of the optical surface. However, it is preferable that curvature of the optical element is limited such that the inclination of the curvature should not be steep. By doing this, it is possible to perform a measuring operation by using a contacting shape measuring device such as a FORM TALYSURF (Trademark registered by TAYLOR HOBSON LTD.). By using the contacting shape measuring device, it is possible to measure the error in shape directly. Therefore, it is possible to determine whether or not the product is defect without measuring the optical characteristics. Also, it is possible to improve the manufacturing processes by the obtained measurement result. Also, it is possible to measure the shape of the optical surface quickly. As a result, there is an advantage in that it is possible to improve the manufacturing efficiency for an optical surface having a power according to the present embodiment.

More specifically, it is preferable that an inclination angle $\theta$ on the optical surfaces of the optical elements should be no more than 60 degrees. The inclination angle $\theta$ is defined as an angle made between the optical axis in an optical surface in the optical element and a normal in an effective diameter of the optical surface. If the maximum inclination angle is no more than 55 degrees, it is possible to enhance the measuring accuracy even in a case in which inaccuracy in shape is large; therefore, it is preferable because it is possible to form accurate optical surfaces easily. It is further preferable if the maximum inclination angle is no more than 50 degrees.

Next, modified examples according to the present embodiment are explained. In any modified examples, differences from the above embodiment are explained. In the explanation for the modified examples, same reference numerals are added to the same members as those in the first embodiment so as to omit duplication in the explanation.

Figure 3A:
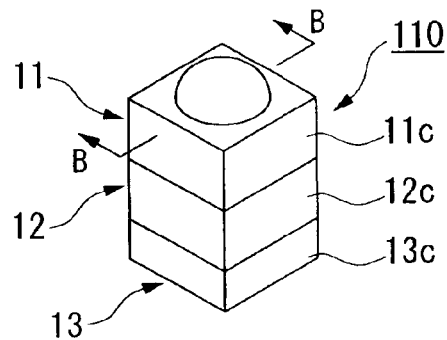
FIG. 3A is a perspective view of a first modification example.
Figure 3B:
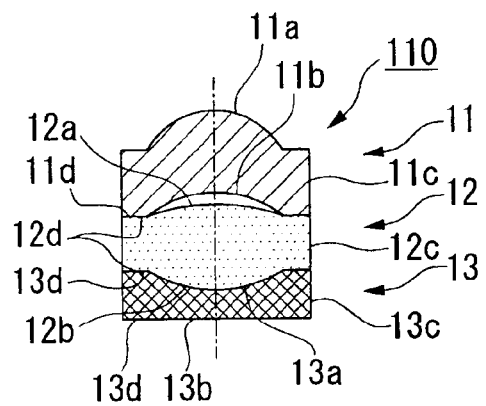
FIG. 3B is a cross section in line B—B in FIG. 3A.
Figure 3C:
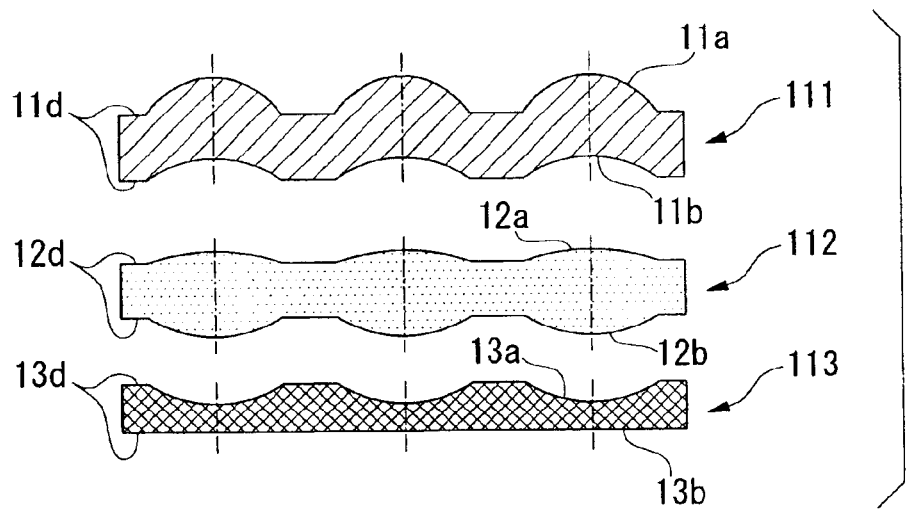
FIGS. 3C and 3D are cross sections of an example for a method for producing the above modification example in an optical axis direction.
Figure 3D:
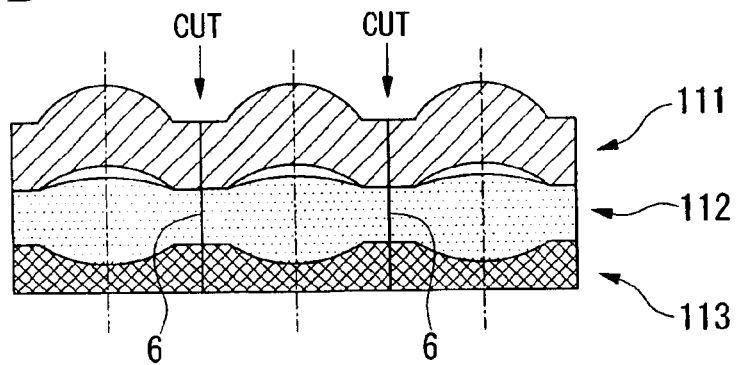

First, a first modified example is explained. FIG. 3A is a perspective view for explaining a first modified example of the present embodiment. FIG. 3B is a cross section in line B—B in FIG. 3A. FIGS. 3C and 3D are cross sections of an example for a method for producing the above modification example in an optical axis direction.

As shown in FIGS. 3A and 3B, an image pickup lens unit 110 according to the present modified example is provided with lenses 11, 12 and 13. Optical axes of these lenses are aligned. These lenses are cemented together respectively by flange sections 11d, 12d, 13d which expand in a direction orthogonal to the optical axis. The flange sections 11d, 12d, 13d are different from the image pickup lens unit 100 shown in FIGS. 1A and 1B so that a positioning protruding section and a positioning groove are not disposed on the flange sections 11d, 12d, 13d. Shape of these flange sections are approximate square in a plan view. These flange sections are provided flange side surfaces 11c, 12c, 13c (side surfaces) which are disposed in arrays on four flat surfaces which are approximately parallel with the optical axes. As shown in FIG. 3A, the flange side surfaces 11c, 12c, and 13c which are disposed in the same direction on the same flat surface along the optical axes.

A lens 11 is a positive lens which is provided with a convex lens surface 11a and a concave lens surface 11b. A lens 12 is a positive lens which is provided with convex lens surfaces 12a and 12b. A lens 13 is a negative lens which is provided with a concave lens surface 13a and a flat lens surface 13b.

A flange section 11d on the lens surface 11b and the flange section 12d on the lens surface 12 contact each other. Here, the radius of curvatures in the lens surface 11b and the lens surface 12a are different; therefore, an air interval is formed between the lens surface 11b and the lens surface 12a.

Also, the lens surface 12b and the lens surface 13a have the same radius of the curvature. The lens surface 12b and the lens surface 13a are cemented together by a bonding agent for the lenses therebetween. In such a case, a power q) in the lens surfaces 12b and 13a as cementing surfaces should satisfy a following condition such as $0<|\phi/\phi_A|<0.5$ (condition 7).

$\phi_A$ is defined as a power in an entire optical system in the image pickup lens unit 110. Here, |a| indicates an absolute value of "a".

The present modified example is different from a case of the image pickup lens unit 100 in that a positioning section in a direction orthogonal to an optical axis of the optical element is not provided. Thus, when an image pickup lens unit 110 is manufactured by using the lenses 11, 12, and 13 independently, a positioning operation in a direction orthogonal to the optical axis is performed by clamping the optical elements by an appropriate fixture and moving the lenses to a position where the optical axes of the optical elements are aligned. Also, the positioning operation may be performed by producing the flange side surfaces 11c, 12c, and 13c on the optical elements such that a distance from the optical axes are accurately uniform and disposing the flange side surfaces 11c, 12c, and 13c on an appropriate reference surface. Also, it may be acceptable if the image pickup lens unit 110 is not manufactured by using the lenses 11, 12, and 13 independently. That is, as shown in FIGS. 3C and 3D, arrays 111, 112, and 113 (optical element arrays) on which the lens surfaces 1a, 11b, 12a, 12b, 13a, and 13b are disposed are-manufactured and the positioning operation is performed by moving optical element arrays respectively so as to cement together and cut therefor. Here, FIGS. 3C and 3D are views for explaining a general idea for a manufacturing process in which such a method is employed to the present modified example. For a member used for an cementing operation and a cutting operation, it is possible to use equivalent members which are used in the first embodiment.

In the present modified example, a lens unit is produced by three optical elements such that a pair of optical surfaces are cemented together. Therefore, it is possible to correct a chromatic aberration by selecting refractive indices of the optical elements which are cemented together appropriately. As a result, it is possible to realize a high quality image pickup lens unit having less chromatic aberration.

Also, the power $\phi$ in the cemented surface satisfies a condition 7; therefore, it is not necessary to make a radius of curvature in the cemented surface excessively small. Therefore, it is possible to form the cemented surface easily. As a result, it is possible to manufacture optical surfaces which is used for an cemented surface by a low cost.

Here, the present modified example was a case in which a pair of lens surfaces are cemented together. For a purpose of improving the correction of the chromatic aberration, it may be possible that the number of the cemented surfaces should increase. In such a case, $\phi$ in the condition 7 should be understood to be a maximum of a power in these cemented surfaces.

In order to improve a formability in the cemented surfaces, it is preferable to satisfy a following condition $$0<|\phi/\phi_A|<0.4 \quad \text{(condition 8)}$$

instead of the condition 7. If it is satisfied, it is possible to increase the radius of curvature.

In order to further improve a formability in the cemented surfaces, it is preferable to satisfy a following condition such as $$0<|\phi/\phi_A|<0.3 \quad \text{(condition 9)}$$

instead of the condition 8.

Figure 4A:
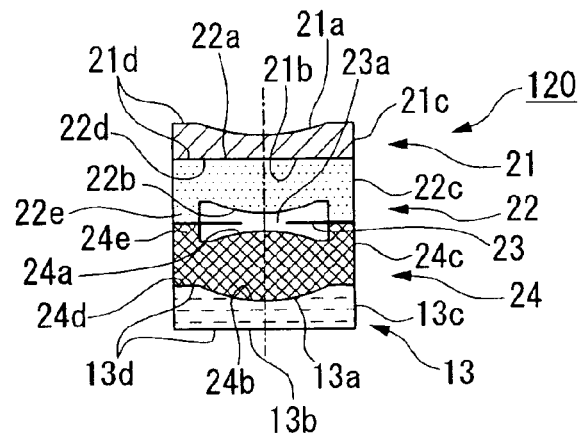
FIG. 4A is a cross section of a second modification example.
Figure 4B:
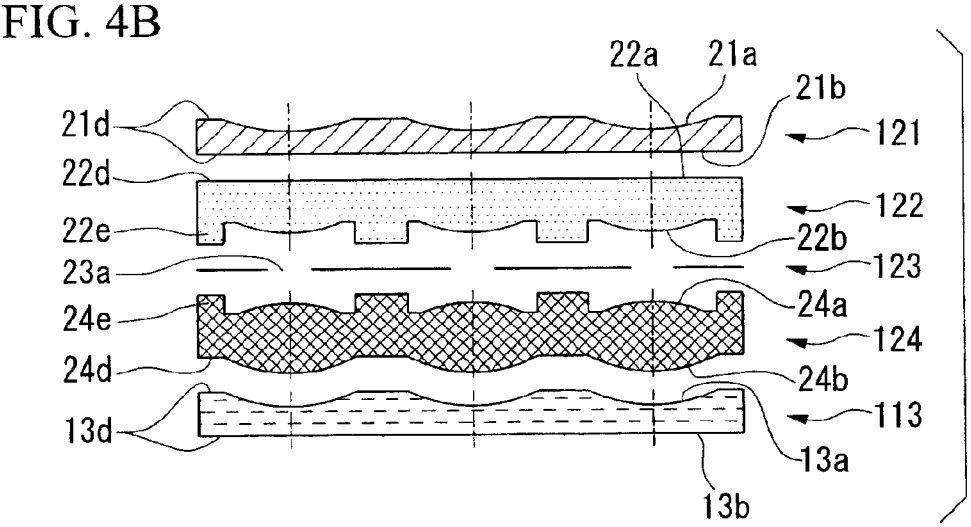
FIGS. 4B and 4C are cross sections showing a general structure of an example for a method for producing the above modification example in an optical axis direction.
Figure 4C:
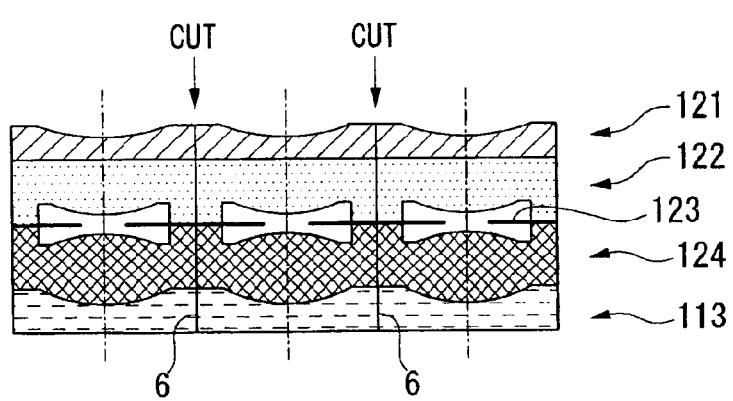

Next, a second modified example is explained. FIG. 4A is a cross section of a second modification example in an optical axis direction. FIGS. 4B and 4C are cross sections showing a general structure of the second modified example for a method for producing the above modification example in an optical axis direction.

As shown in FIG. 4A, an image pickup lens unit 120 according to the present modified example is provides with four optical elements such as lenses 21, 22, 24, and 13. An aperture stop 23 (retaining member) for restricting a beam in a predetermined shape is disposed between the lenses 22 and 24. Each optical element is provided with the flange side surfaces 21c, 22c, 24c, and 13c (side surfaces). The flange side surfaces which are disposed in the same direction on the same flat surface along the optical axes.

A lens 21 is a flat-concave lens. A lens 22 is a flat-convex lens. The lenses 21 and 22 are cemented together on flat lens surfaces 21b and 22a respectively. In the lens 22, a positioning protruding section 22e which protrudes in an optical axis direction is formed on the flange section 22d which faces to the convex lens surface 22b.

An aperture stop 23 is made of a synthetic resin member or a metal member of which surface absorbs a light. The aperture stop 23 is provided with an end surface which coincides a surface on which the flange side surfaces 21c, 22c, 24c, and 13c on the optical elements are disposed in arrays.

A lens 24 is a positive lens having convex surfaces on both sides. A lens surface 24b is cemented with a concave surface of the lens surface 13a. A positioning protruding section 24e which protrudes in an optical axis direction is formed on the lens surface 24a side of the flange section 24d.

The positioning protruding sections 22e and 24e face each other so as to be cemented together such that the aperture stop 23 is sandwiched therebetween. An air interval is formed between the lens surfaces 22b and 24a.

The image pickup lens unit 120 can be manufactured by cementing the arrays 121, 122, and 124 (optical element arrays) on which the lens surfaces 21a, 21b, 22a, 22b, 24a, and 24b are disposed in arrays and an array 113 together and cutting the cemented optical element arrays as shown in FIGS. 4B and 4C. In such a case, the aperture stop 23 is formed by cementing the aperture stop sheet 123 having an aperture section which coincides a disposition pitch of the optical elements is sandwiched and cemented between the arrays 122 and 124. Here, for a member for forming the aperture stop sheet 123, a synthetic resin member or a metal member can be used.

According to the present modified example, it is possible to form an air interval having a predetermined distance between the lens surface 22b and the lens surface 24b by the facing positioning protruding sections 22e and 24e. Also, the optical elements are cemented at the flange sections; therefore, it is possible to simplify a shape of the optical elements which are formed unitarily. As a result, there is an advantage in that a formability of the optical elements improves and it is possible to improve the productivitiy simultaneously with realizing the accuracy in the molding operation.

Also, according to the present modified example, it is possible to form the aperture stop 23 in the image pickup lens unit 120 unitarily. In such a case, it is possible to perform the positioning operation and the cementing operation for the optical elements by equivalent processes by using the aperture stop sheet 123; therefore, there is an advantage in that it is possible to assemble the image pickup lens unit very accurately easily.

Figure 5A:
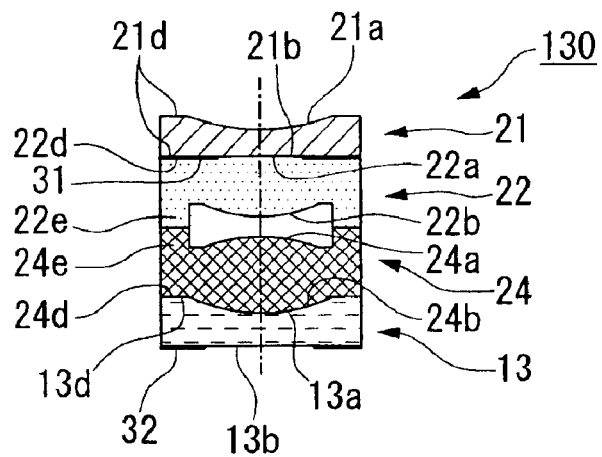
FIG. 5A is a cross section of a third modification example.
Figure 5B:
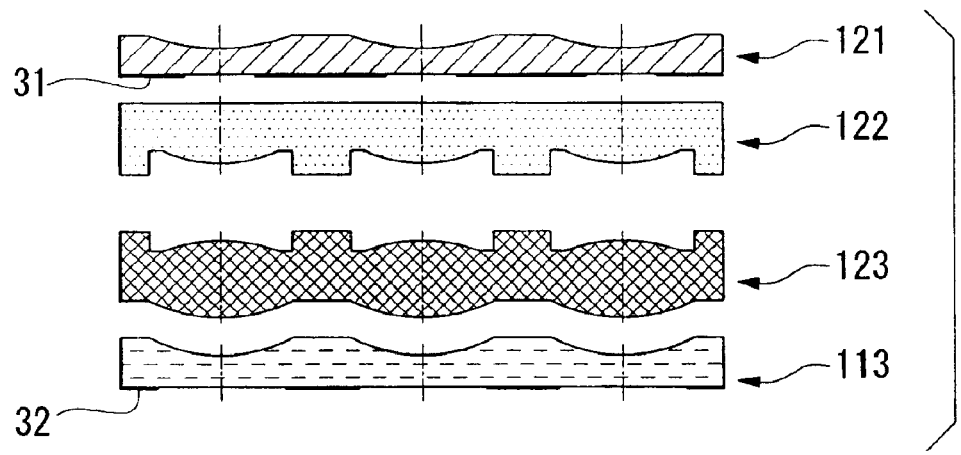
FIGS. 5B and 5C are cross sections showing a general structure of an example for a method for producing the above modification example in an optical axis direction.
Figure 5C:
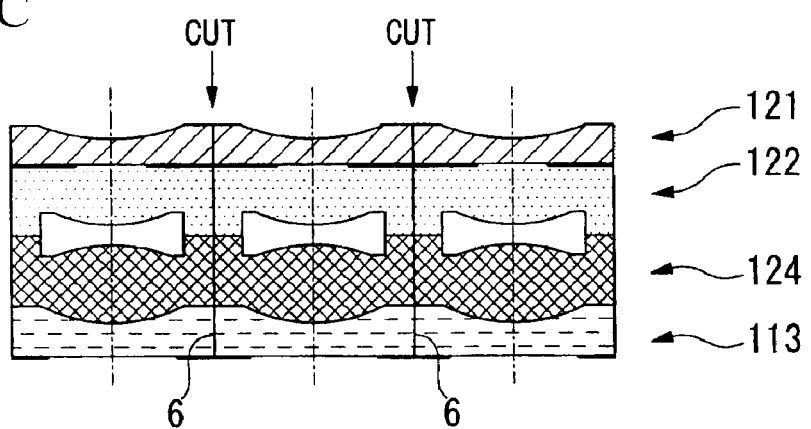

Next, a third modified example is explained. FIG. 5A is a cross section in an optical axis direction for explaining the third modification example according to the present embodiment. FIGS. 5B and 5C are cross sections showing a general structure of an example for a method for producing the above modification example in an optical axis direction.

As shown in FIG. 5A, an image pickup lens unit 130 according to the present modified example is provided with the lenses 21, 22, 24, and 13 which are same construction of the second modified example. The flange side sections 21c, 22c, 24c, and 13c are disposed in the same direction on the same flat surface in the optical axis direction respectively.

Here, an aperture stop coating 31 as a shielding layer (film) is formed on a lens surface 21b on the lens 21. A beam having a predetermined distance is incident to the lens 21 through the aperture stop coating 31. Also, a flare stop coating 32 as a shiedling layer is formed on a lens surface 13b on the lens 13. It is possible to prevent a light from being incident from a section except an effective lens diameter by the flare stop coating 32. That is, the flare stop coating 32 is provided with a flare preventing function.

The aperture stop coating 31 and the flare stop coating 32 can be formed by applying a light-absorbing material or performing a vapor deposition operation. When the aperture stop coating 31 and the flare stop coating 32 are produced by using the optical element array, the aperture stop coating 31 and the flare stop coating 32 are formed in the arrays 121 and 113 respectively so as to be cemented together as shown in FIGS. 5B and 5C.

According to the present modified example, the aperture stop coating 31 and the flare stop coating 32 are formed in the optical elements respectively; therefore, it is not necessary to form the apertures by using different members for forming the apertures. Therefore, it is possible to omit a process for positioning the optical elements when the optical elements are cemented together; thus, it is possible to reduce the number of the members for forming the image pickup lens unit. As a result, it is possible to improve the productivity; thus, it is possible to reduce the production cost.

Figure 6A:
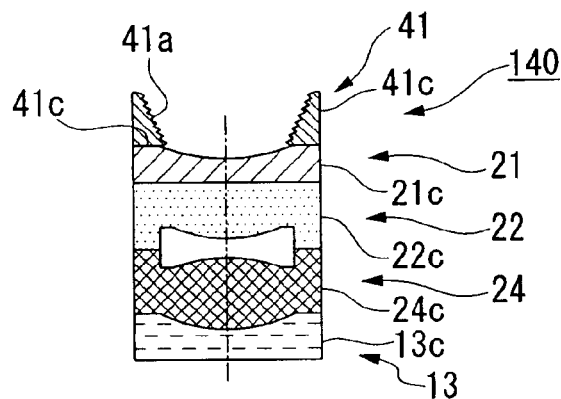
FIG. 6A is a cross section of a fourth modification example.
Figure 6B:
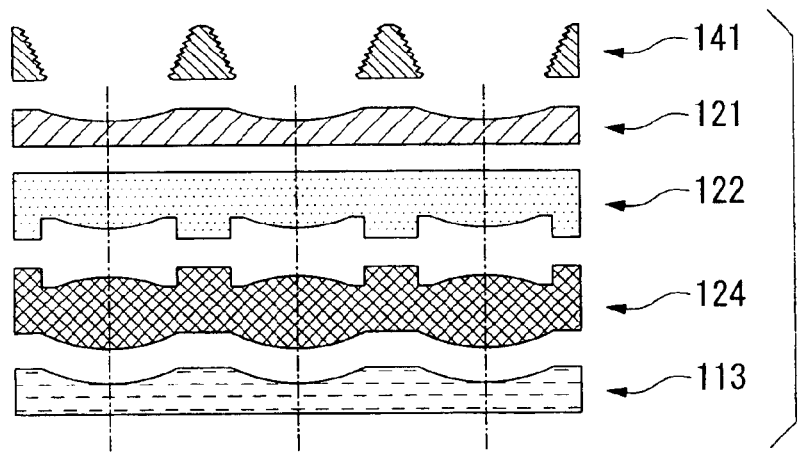
FIGS. 6B and 6C are cross sections showing a general structure of an example for a method for producing the above modification example in an optical axis direction.
Figure 6C:
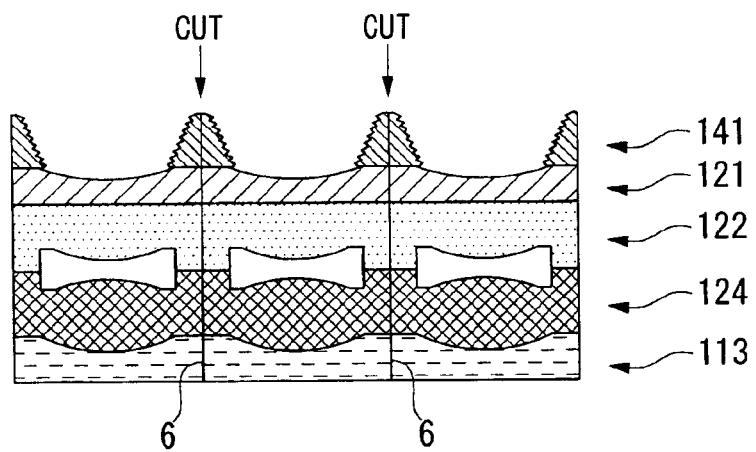

Next, a fourth modified example is explained. FIG. 6A is a cross section in an optical axis direction for explaining a fourth modification example according to the present invention. FIGS. 6B and 6C are cross sections showing a general structure of an example for a method for producing the above modification example in an optical axis direction.

As shown in FIG. 6A, an image pickup lens unit 140 according to the present modified example is provided with the lenses 21, 22, 24, and 13 which are the same construction of the second modified example. The flange side sections 21c, 22c, 24c, and 13c are disposed in the same direction on the same flat surface in the optical axis direction respectively.

In the present modified example, a hood member 41 is cemented to the lens 21. The hood member 41 is made of a synthetic resin member of which surface is at least processed to absorb a light. The hood member 41 is a wall member which has an inclined internal surface 41a. The internal surface 41a expands in an optical axis direction so as to surround the effective lens diameter of the lens 21 under condition that the diameter of the inner surface 41a enlarges gradually. According to such a structure, the hood member 41 has a function for restricting an external light which is incident to the lens 21. An outer peripheral surface 41c is disposed in array on the flange side surfaces 21c, 22c, 24c, and 13c.

In the present modified example, it is possible to employ a manufacturing method in which a hood array member 141 is produced such that the hood member 41 is formed under an array condition, and the hood array member 141 and the optical element array are cemented together so as to be cut.

According to the present modified example, the hood member 41 and the optical elements are cemented together unitarily; therefore, an external light is hardly incident. Thus, it is possible to produce an image pickup lens unit having an improved image quality in which the external light is hardly incident easily and low cost.

Here, in the first embodiment, the explanation was made for a case in which the side surfaces of the optical elements are disposed in arrays on surfaces of a prismatic column having approximate square cross section. However, it should be understood that the present invention is not limited to such a case in which prismatic column surface is used. It is possible to use various shapes according to factors such as production efficiency for the image pickup lens unit and accommodation in the assembly operation and a handling operation.

Figure 7A:
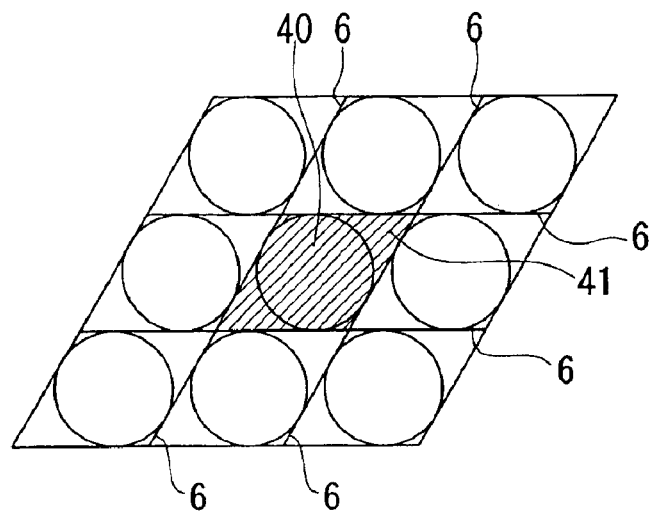
FIGS. 7A to 7C are views for showing cross sections for an optical element arrays in the first embodiment according to the present invention.
Figure 7B:
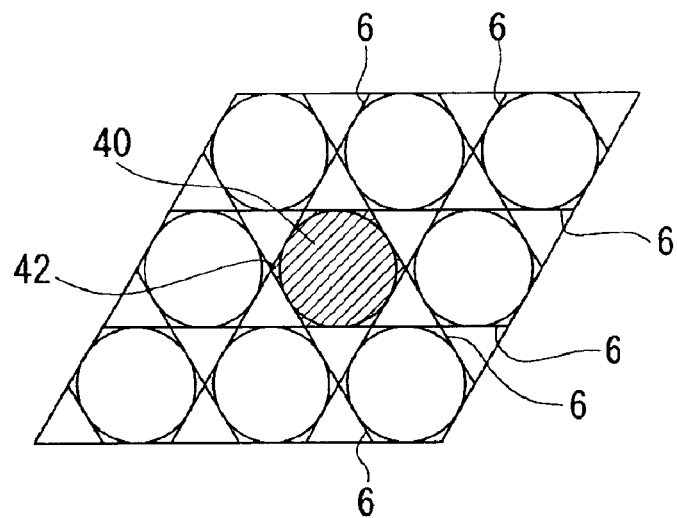

For example, it is easy to cut the optical element under a linear cutting condition in the production process. Therefore, it is possible to reduce the production processes particularly when the optical element array is cut. Thus, it is efficient in the production processes by using the above cutting method. Also, an outer shape of the image pickup lens unit is not necessary to be in a square cross section in the cutting operation. For example, the outer shape of the image pickup lens unit may be in a prismatic diamond cross section as shown in FIG. 7A. In such a case, it is different from a case of a square cross section in that the outer peripheral sections of the optical surface 40 do not contact each other when the optical surfaces 40 are disposed most densely so as to be cut. Therefore, there is an advantage in that it is possible to mold the optical surfaces accurately. Also, in FIG. 8B, an example of a hexagonal cross section is shown. In such a case, there is an advantage in that it is possible to produce a light weight image pickup lens unit because the flange section 41 is small.

Figure 7C:
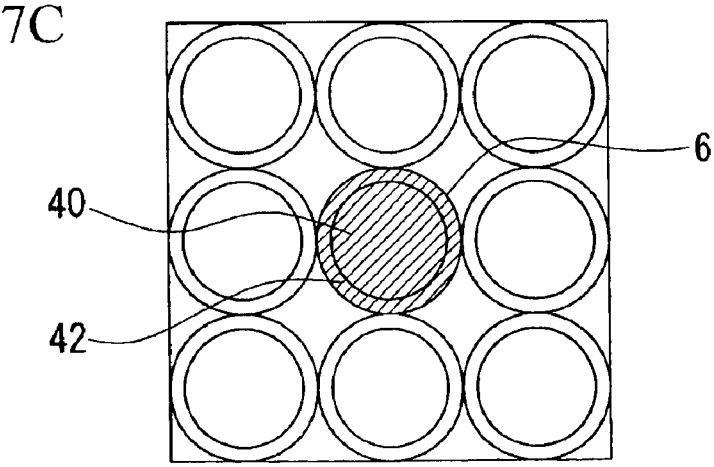

Also, by using a cutting method in which a laser or a water jet are used, it is possible to form a flat surface/curvature surface which expand linearly in an optical axis direction. Therefore, it may be possible to cut in an circular cross section as shown in FIG. 7C. Such an image pickup lens unit which is disposed in arrays in a cylindrical surface can be cemented quite easily when it is used for a reference surface for cementing an array surface because there is no directivity around the optical axis.

Also, the above explanation was made for a case in which the side surfaces of the optical elements are approximately parallel with the optical axis. However, it may be acceptable that the side surfaces of the optical elements are inclined according to the optical axis. For example, it may be acceptable if the inclination occurs because of inaccurate cutting operation. Also, it may be acceptable if the inclination is disposed so as to dispose on a predetermined surface.

Also, the above explanation was made for a case in which the optical elements are provided with the flange side surfaces 1c, 2c, 3c, 4c, 11c, 12c, 13c, 21c, 22c, 24c, 25c, and 152c which are disposed on the flange sections 1d, 2d, 3d, 4d, 11d, 12d, 13d, 21d, 22d, 24d, and 25d for side surfaces. However, it may be acceptable if an edge of the optical element is used for the surface of the optical element.

Also, the above explanation was made for a case in which the side surfaces of the optical elements are disposed to be aligned as a preferable example for production processes. However, it is not necessary that the side surfaces of the optical elements be disposed to be aligned for a purpose of forming an image pickup lens unit in which a mirror cylinder member is simply omitted. This is because the optical elements can be cemented together on surfaces of the optical axis of the flange sections 1d, 2d, 3d, 4d, 11d, 12d, 13d, 21d, 22d, 24d, and 25d.

Also, the above explanation was made by showing an example in which the optical element arrays are disposed under two dimensional arrangement. However, more importantly, it should be understood that the optical element arrays are disposed under one dimensional arrangement.

Also, when the optical elements are manufactured by cutting the optical element arrays, it may be acceptable that a plurality of optical elements are cut in a disposition direction so as to form an image pickup lens unit having a plurality of parallel optical axes. In such a case, it may be acceptable that different kinds of surfaces can be used for a plurality of the optical elements in the disposition direction.

Specific numeral embodiments for the optical systems which can be used for an image pickup lens unit according to the first embodiment of the present invention are explained as follows. Here, following definitions are common in each embodiments. That is, ω indicates a diagonal field angle full. F indicates an effective F number. So indicates an objective distance. 1H indicates an image height. It should be understood that values and definitions which are indicated by ST/TD, MT/TD, inclination angle θ, |φ/φ$_a$|, TT, MD/ED are the same as explained above.

Also, in TABLES for numeral data later, r indicates a curvature of radius. d indicates an intersurface interval. n$_d$ indicates a refractive index. vd indicates Abbe number. Characters such as r$_i$, d$_i$, n$_i$, v$_i$ (i is an integer) indicate a curvature of radius, an intersurface interval, a refractive index, and Abbe number of i$_{th}$ surface respectively. In drawings showing optical paths, relationship between numeral data and factors such as r$_i$, d$_i$, and n$_i$.

Embodiment 1

Figure 8:
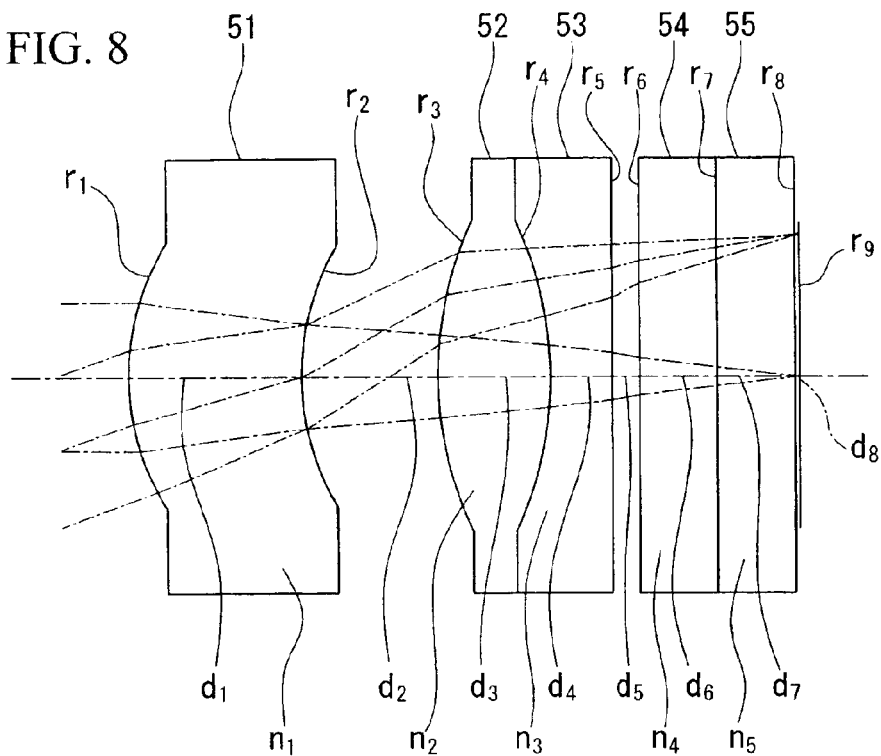
FIG. 8 shows an optical path in a first data example in an image pickup lens unit in the first embodiment according to the present invention.

In FIG. 8, an optical path according to a first numeral embodiment is shown. FIGS. 9A to 9C show aberration according to the present embodiment. FIG. 9A shows spherical aberration which were calculated according to wavelengths such as 656.27 nm, 587.56 nm, 546.07 nm, 486.13 nm, and 435.84 nm under condition that a horizontal axis indicates a spherical aberration (unit: mm) and a vertical axis indicates an aperture ratio. FIG. 9B shows an aberration under condition that a horizontal axis indicates an astigmatism (unit: mm) and a vertical axis indicates a perspective angle (unit: °). ΔM indicates a shift amount of a meridional image surface. ΔS indicates a shift amount of a sagital image surface. FIG. 9C shows an aberration under condition that a horizontal axis indicates a distortion (unit: %) and a vertical axis indicates a perspective angle (unit: °).

The present embodiment is provided with a first lens 51 having a positive power, a second lens 52 having a positive power, a third lens 53 having a negative power, and filter members 54, 55 in such an order from an object toward the image pickup lens unit. An air interval is disposed between the first lens 51 and the second lens 52. An optical surface of the second lens 52 and an optical surface of the third lens 53 are cemented together. Here, an aperture which is not shown in the drawing is formed near an image surface of the first lens 51.

Figure 10A:
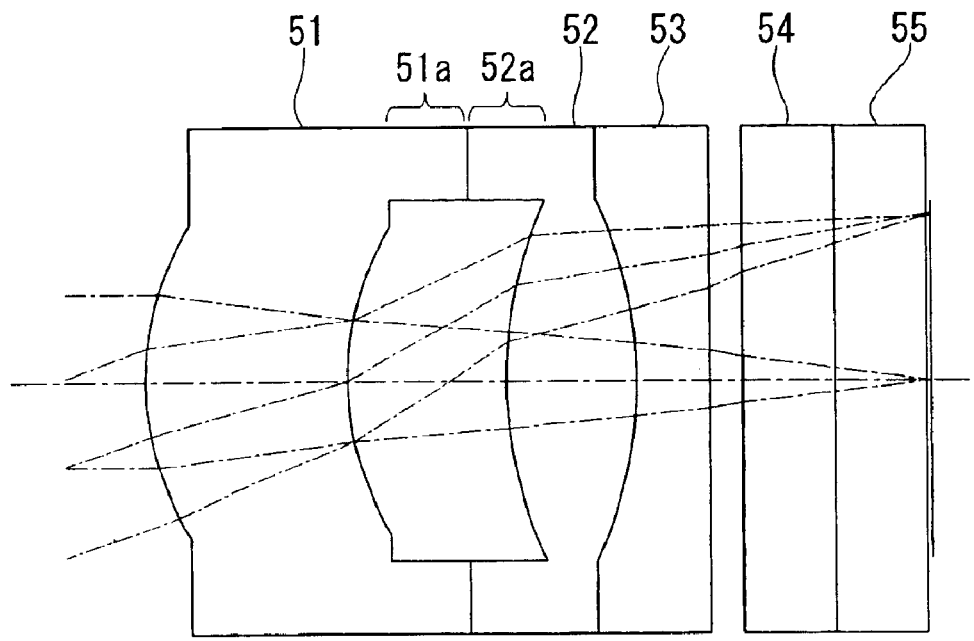
FIGS. 10A and 10B are cross sections for explaining a method for forming an air interval in the first data example in an optical axis direction.
Figure 10B:
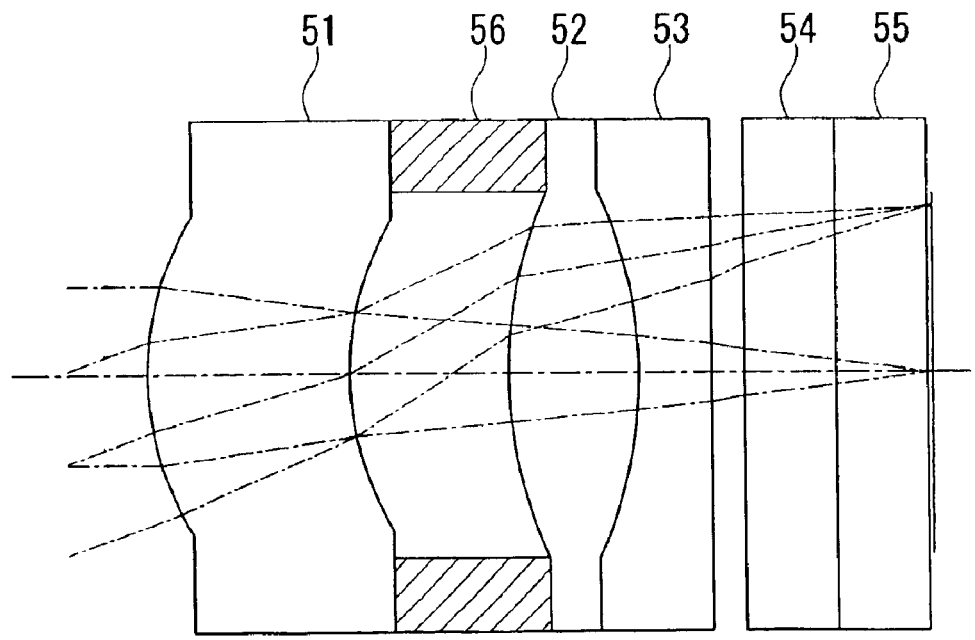

In the air interval between the first lens 51 and the second lens 52, it may be acceptable that positioning protruding sections 51a and 52a are disposed on the first lens 51 and the second lens 52 respectively shown in FIG. 10A so as to be contacted each other. Also, it may be acceptable that a spacer 56 (sandwiching member) is put between the first lens 51 and the second lens 52 as shown in FIG. 10B.

Here, all the air intervals in the rest of the numeral embodiments which are explained later can be formed according to any one of the above structures.

The present embodiment is under condition that a focal distance is under defocused condition such as an objective distance So=960 mm. Diagonal perspective angle ω is 40°. Effective F number is under condition of F2.8. Image height is under condition of 1H=0.924 mm.

Also, the rest of the conditions are such that air surfaces are six surfaces, ST/TD=0.42, MT/TD-0.20, inclination angle=33°, and |φ/φ$_A$|=0.08. Curvature of image is corrected by disposing an air interval between the first lens 51 and the second lens 52.

| Surface | r | d | n$_d$ | v$_d$ |
|---|---|---|---|---|
| 1 | r$_1$ = 1.64 | d$_1$ = 1.11 | n$_1$ = 1.8061 | v$_1$ = 40.9 |
| 2 | r$_2$ = 1.69 | d$_2$ = 0.87 | | |
| 3 | r$_3$ = 2.38 | d$_3$ = 0.72 | n$_2$ = 1.8061 | v$_2$ = 40.9 |
| 4 | r$_4$ = −2.38 | d$_4$ = 0.40 | n$_3$ = 1.6889 | v$_3$ = 31.1 |

-continued

| Surface | r | d | n$_d$ | v$_d$ |
|---|---|---|---|---|
| 5 | r$_5$ = ∞ | d$_5$ = 0.18 | | |
| 6 | r$_6$ = ∞ | d$_6$ = 0.50 | n$_4$ = 1.5163 | v$_4$ = 64.1 |
| 7 | r$_7$ = ∞ | d$_7$ = 0.50 | n$_5$ = 1.5163 | v$_5$ = 64.1 |
| 8 | r$_8$ = ∞ | d$_8$ = 0.03 | | |
| 9 | r$_9$ = ∞ (image surface) | | | |

As understood from FIGS. 9A to 9C, the image pickup lens unit according to the present embodiment has a preferable aberration correction in visible range of rays.

Embodiment 2

Figure 11:
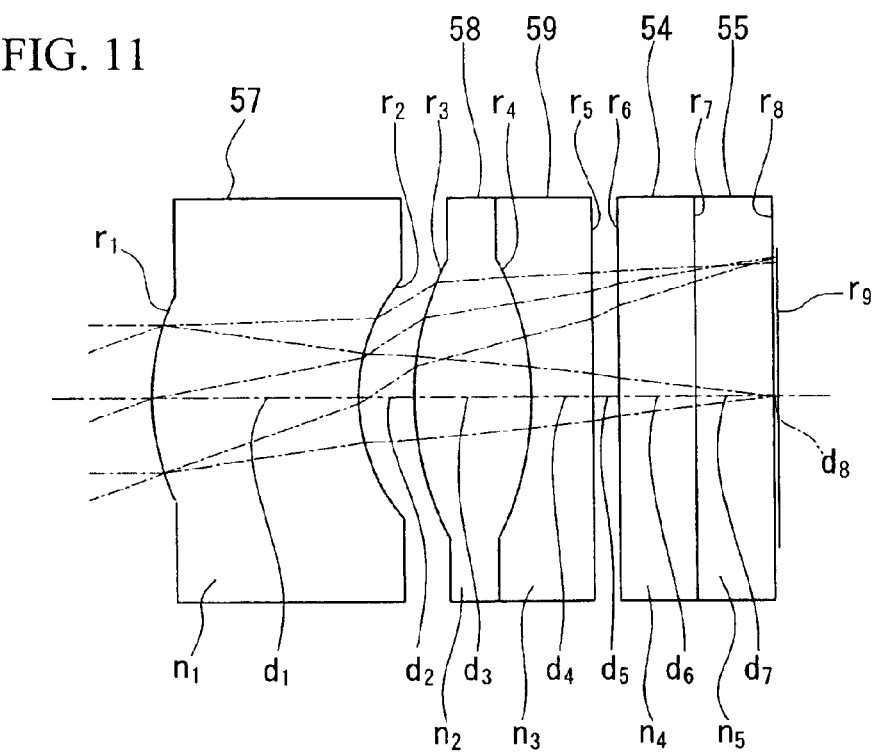
FIG. 11 shows an optical path in a second data example for an image pickup lens unit in the first embodiment according to the present invention.

In FIG. 11, an optical path according to a second numeral embodiment is shown. FIGS. 12A to 12C show aberrations according to the present embodiment. FIGS. 12A to 12C are described under the same condition as in FIGS. 9A to 9C; therefore, explanations for a horizontal axis and a vertical axis are-omitted.

The present embodiment is provided with a first lens 57 having a positive power, a second lens 58 having a positive power, a third lens 59 having a negative power, and filter members 54, 55 in such an order from an object toward the image pickup lens unit. An air interval is disposed between the first lens 57 and the second lens 58. An optical surface of the second lens 58 and an optical surface of the third lens 59 are cemented together. Here, an aperture which is not shown in the drawing is formed near an image surface of the first lens 57.

The present embodiment is under condition that a focal distance is under defocused condition such as an objective distance So=960 mm. Diagonal perspective angle ω is 40°. Effective F number is under condition of F2.8. Image height is under condition of 1H=0.924 mm.

Also, the rest of the conditions are such that air surfaces are six surfaces, ST/TD=0.14, MT/TD=0.09, inclination angle=37°, and |φ/φ$_A$|=0.09. Curvature of image is corrected by disposing an air interval between the first lens 57 and the second lens 58.

| Surface | r | d | n$_d$ | v$_d$ |
|---|---|---|---|---|
| 1 | r$_1$ = 1.54 | d$_1$ = 1.33 | n$_1$ = 1.8061 | v$_1$ = 40.9 |
| 2 | r$_2$ = 1.20 | d$_2$ = 0.35 | | |
| 3 | r$_3$ = 1.96 | d$_3$ = 0.75 | n$_2$ = 1.8061 | v$_2$ = 40.9 |
| 4 | r$_4$ = −1.96 | d$_4$ = 0.40 | n$_3$ = 1.6889 | v$_3$ = 31.1 |
| 5 | r$_5$ = ∞ | d$_5$ = 0.17 | | |
| 6 | r$_6$ = ∞ | d$_6$ = 0.50 | n$_4$ = 1.5163 | v$_4$ = 64.1 |
| 7 | r$_7$ = ∞ | d$_7$ = 0.50 | n$_5$ = 1.5163 | v$_5$ = 64.1 |
| 8 | r$_8$ = ∞ | d$_8$ = 0.03 | | |
| 9 | r$_9$ = ∞ (image surface) | | | |

As understood from FIGS. 12A to 12C, the image pickup lens unit according to the present embodiment has a preferable aberration correction in visible range of rays.

Embodiment 3

Figure 13:
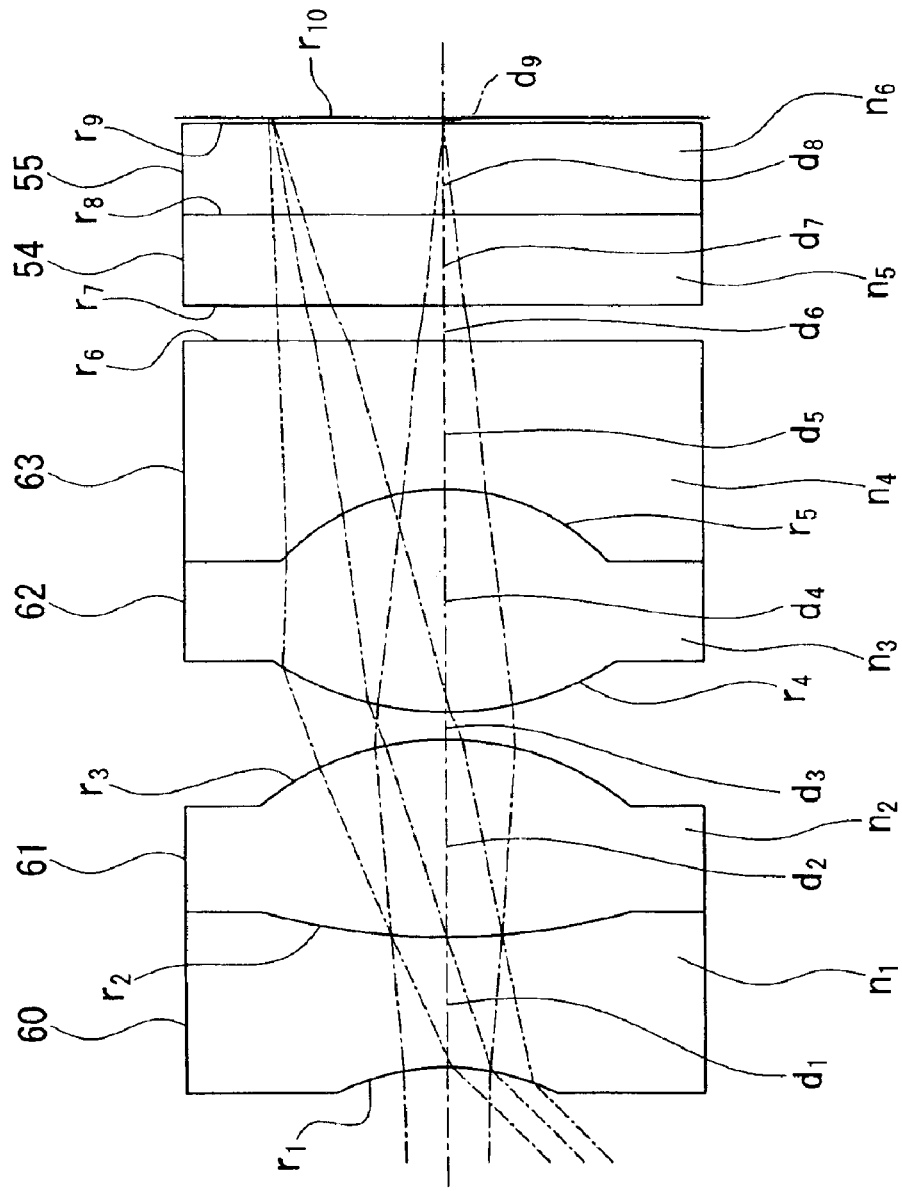
FIG. 13 shows an optical path in a third data example for an image pickup lens unit in the first embodiment according to the present invention.

In FIG. 13, an optical path according to a third numeral embodiment is shown. FIGS. 14A to 14C show aberrations according to the present embodiment. FIGS. 14A to 14C are described under the same condition as in FIGS. 9A to 9C; therefore, explanations for a horizontal axis and a vertical axis are omitted.

The present embodiment is provided with a first lens 60 having a negative power, a second lens 61 having a positive power, a third lens 63 having a positive power, a fourth lens 62 having a negative power, and filter members 54, 55 in such an order from an object toward the image pickup lens unit. An optical surface of the first lens 60 and an optical surface of the second lens 61 are cemented together. Also, an optical surface of the third lens 62 and an optical surface of the fourth lens 63 are cemented together. An air interval is disposed between the second lens 61 and the third lens 62. Here, an aperture which is not shown in the drawing is formed near an image surface of the first lens 65 by performing a vapor deposition.

The present embodiment is under condition that a focal distance is under condition of objective distance: So=10 mm. Diagonal perspective angle ω is 90° Effective F number is under condition of F 3.0. Image height is under condition of 1H=0.924 mm.

Also, the rest of the conditions are such that air surfaces are six surfaces, ST/TD=0.07, MT/TD=0.04, inclination angle=46°, and $<\phi/\phi_A|=0.07$. Curvature of image is corrected by disposing an air interval between the second lens 61 and the third lens 62.

| Surface | r | d | $n_d$ | $v_d$ |
|---|---|---|---|---|
| 1 | $r_1 = -1.30$ | $d_1 = 0.71$ | $n_1 = 1.6889$ | $v_1 = 31.1$ |
| 2 | $r_2 = 3.75$ | $d_2 = 1.08$ | $n_2 = 1.8061$ | $v_2 = 40.9$ |
| 3 | $r_3 = -1.57$ | $d_3 = 0.15$ | | |
| 4 | $r_4 = 1.67$ | $d_4 = 1.22$ | $n_3 = 1.5831$ | $v_3 = 59.4$ |
| 5 | $r_5 = -1.18$ | $d_5 = 0.81$ | $n_4 = 1.6889$ | $v_4 = 31.1$ |
| 6 | $r_6 = \infty$ | $d_6 = 0.19$ | | |
| 7 | $r_7 = \infty$ | $d_7 = 0.50$ | $n_5 = 1.5163$ | $v_5 = 64.1$ |
| 8 | $r_8 = \infty$ | $d_8 = 0.50$ | $n_6 = 1.5163$ | $v_6 = 64.1$ |
| 9 | $r_9 = \infty$ | $d_9 = 0.03$ | | |
| 10 | $r_{10} = \infty$ (Image surface) | | | |

As understood from FIGS. 14A to 14C, the image pickup lens unit according to the present embodiment has a preferable aberration correction in visible range of rays. In particular, it is understood from FIG. 14A that a chromatic aberration is more preferably corrected than in the cases of the first embodiment and the second embodiment because two pairs of cemented lenses are used therein. Furthermore, as shown in FIG. 14B, astigmatism is also quire preferably corrected.

Embodiment 4

Figure 15:
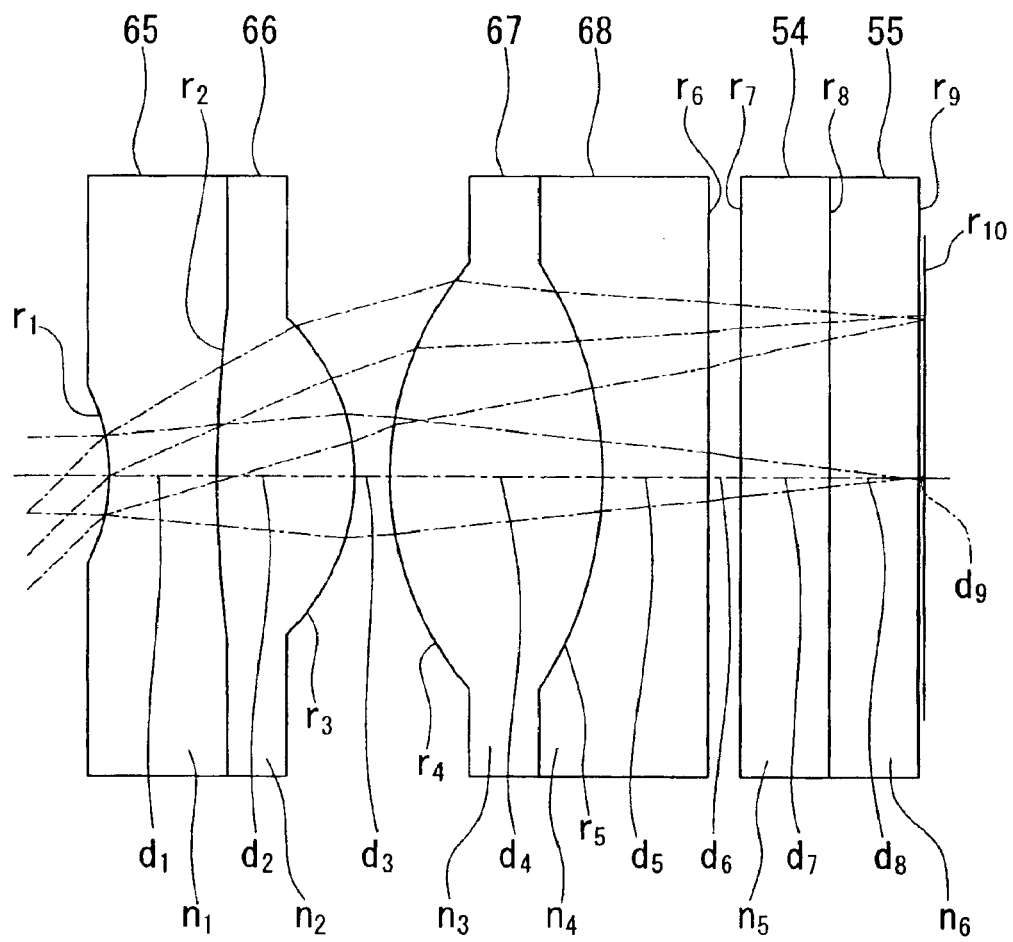
FIG. 15 shows an optical path in a fourth data example for an image pickup lens unit in the first embodiment according to the present invention.

In FIG. 15, an optical path according to a fourth numeral embodiment is shown. FIGS. 16A to 16C show aberrations according to the present embodiment. FIGS. 16A to 16C are described under the same condition as in FIGS. 9A to 9C; therefore, explanations for a horizontal axis and a vertical axis are omitted.

The present embodiment is provided with a first lens 65 having a negative power, a second lens 66 having a positive power, a third lens 67 having a positive power, a fourth lens 68 having a negative power, and filter members 54, 55 in such an order from an object toward the image pickup lens unit. An optical surface of the first lens 65 and an optical surface of the second lens 66 are cemented together. Also, an optical surface of the third lens 67 and an optical surface of the fourth lens 68 are cemented together. An air interval is disposed between the second lens 66 and the third lens 67. Here, an aperture which is not shown in the drawing is formed on a side surface of the first lens 65 by performing a vapor deposition.

The present embodiment is under condition that a focal distance is under condition of objective distance: So=10 mm. Diagonal perspective angle ω is 90°. Effective F number is under condition of F 3.0. Image height is under condition of 1H=924 mm.

Also, the rest of the conditions are such that air surfaces are four surfaces, ST/TD=0.09, MT/TD=0.04, inclination angle=45°, and $|\phi/100_A|=0.04$. Curvature of image is corrected by disposing an air interval between the second lens 66 and the third lens 67.

| Surface | r | d | $n_d$ | $v_d$ |
|---|---|---|---|---|
| 1 | $r_1 = -1.11$ | $d_1 = 0.60$ | $n_1 = 1.6889$ | $v_1 = 31.1$ |
| 2 | $r_2 = 7.95$ | $d_2 = 0.77$ | $n_2 = 1.8061$ | $v_2 = 40.9$ |
| 3 | $r_3 = -1.24$ | $d_3 = 0.20$ | | |
| 4 | $r_4 = 1.87$ | $d_4 = 1.19$ | $n_3 = 1.5831$ | $v_3 = 59.4$ |
| 5 | $r_5 = -2.18$ | $d_5 = 0.60$ | $n_4 = 1.6889$ | $v_4 = 31.1$ |
| 6 | $r_6 = \infty$ | $d_6 = 0.18$ | | |
| 7 | $r_7 = \infty$ | $d_7 = 0.50$ | $n_5 = 1.5163$ | $v_5 = 64.1$ |
| 8 | $r_8 = \infty$ | $d_8 = 0.50$ | $n_6 = 1.5163$ | $v_6 = 64.1$ |
| 9 | $r_9 = \infty$ | $d_9 = 0.03$ | | |
| 10 | $r_{10} = \infty$ (Image Surface) | | | |

As understood from FIGS. 16A to 16C, the image pickup lens unit according to the present embodiment has a preferable aberration correction in visible range of rays. In particular, it is understood from FIG. 14A that a chromatic aberration is more preferably corrected than in the cases of the first embodiment and the second embodiment because two pairs of cemented lenses are used therein. Furthermore, as shown in FIG. 14B, astigmatism is also quire preferably corrected.

Embodiment 5

Figure 17:
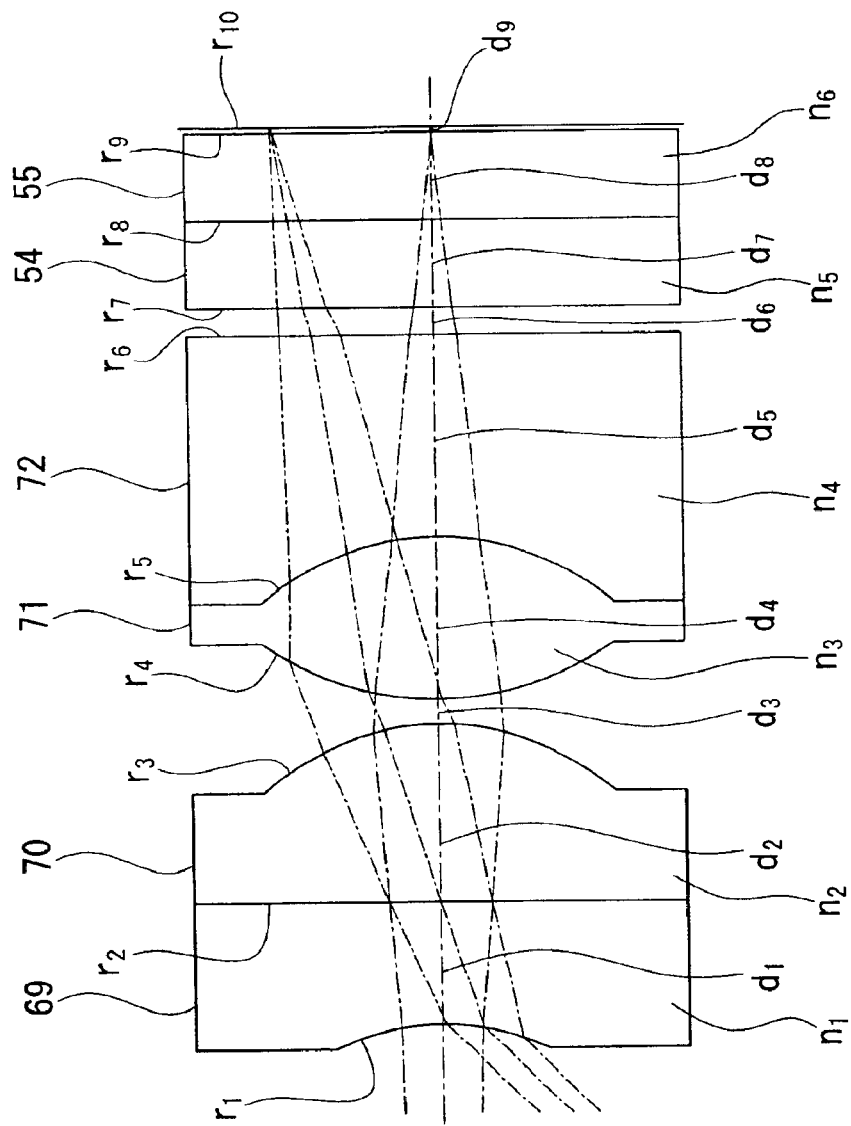
FIG. 17 shows an optical path in a fifth data example for an image pickup lens unit in the first embodiment according to the present invention.

In FIG. 17, an optical path according to a fifth numeral embodiment is shown. FIGS. 18A to 18C show aberrations according to the present embodiment. FIGS. 18A to 18C are described under the same condition as in FIGS. 9A to 9C; therefore, explanations for a horizontal axis and a vertical axis are omitted.

The present embodiment is provided with a first lens 69 having a negative power, a second lens 70 having a positive power, a third lens 71 having a positive power, a fourth lens 72 having a negative power, and filter members 54, 55 in such an order from an object toward the image pickup lens unit. An optical surface of the first lens 69 and an optical surface of the second lens 70 are cemented together. Also, an optical surface of the third lens 71 and an optical surface of the fourth lens 72 are cemented together. An air interval is disposed between the second lens 70 and the third lens 71. Here, an aperture which is not shown in the drawing is formed on an image surface of the first lens 69 by performing a vapor deposition.

The present embodiment is under condition that a focal distance is under condition of objective distance: So=10 mm. Diagonal perspective angle ω is 90° Effective F number is under condition of F 3.0. Image height is under condition of 1H=924 mm.

Also, the rest of the conditions are such that air surfaces are six surfaces, ST/TD=0.07, MT/TD=0.03, inclination angle=41°, and $|\phi/\phi_A|=0.06$. Curvature of image is corrected by disposing an air interval between the second lens 70 and the third lens 71.

| Surface | r | d | $n_d$ | $v_d$ |
|---|---|---|---|---|
| 1 | $r_1 = -1.32$ | $d_1 = 0.70$ | $n_1 = 1.6889$ | $v_1 = 31.1$ |
| 2 | $r_2 = \infty$ | $d_2 = 1.02$ | $n_2 = 1.8061$ | $v_2 = 40.9$ |
| 3 | $r_3 = -1.46$ | $d_3 = 0.15$ | | |
| 4 | $r_4 = 1.74$ | $d_4 = 0.93$ | $n_3 = 1.5831$ | $v_3 = 59.4$ |
| 5 | $r_5 = -1.50$ | $d_5 = 1.15$ | $n_4 = 1.6889$ | $v_4 = 31.1$ |
| 6 | $r_6 = \infty$ | $d_6 = 0.16$ | | |
| 7 | $r_7 = \infty$ | $d_7 = 0.50$ | $n_5 = 1.5163$ | $v_5 = 64.1$ |

-continued

| Surface | r | d | $n_d$ | $v_d$ |
|---|---|---|---|---|
| 8 | $r_8 = \infty$ | $d_8 = 0.50$ | $n_6 = 1.5163$ | $v_6 = 64.1$ |
| 9 | $r_9 = \infty$ | $d_9 = 0.03$ | | |
| 10 | $r_{10} = \infty$ (Image Surface) | | | |

As understood from FIGS. 18A to 18C, the image pickup lens unit according to the present embodiment has a preferable aberration correction in visible range of rays. In particular, it is understood from FIG. 18A that a chromatic aberration is more preferably corrected than in the cases of the first embodiment and the second embodiment because two pairs of cemented lenses are used therein. Furthermore, as shown in FIG. 18B, astigmatism is also quire preferably corrected.

Embodiment 6

Figure 19:
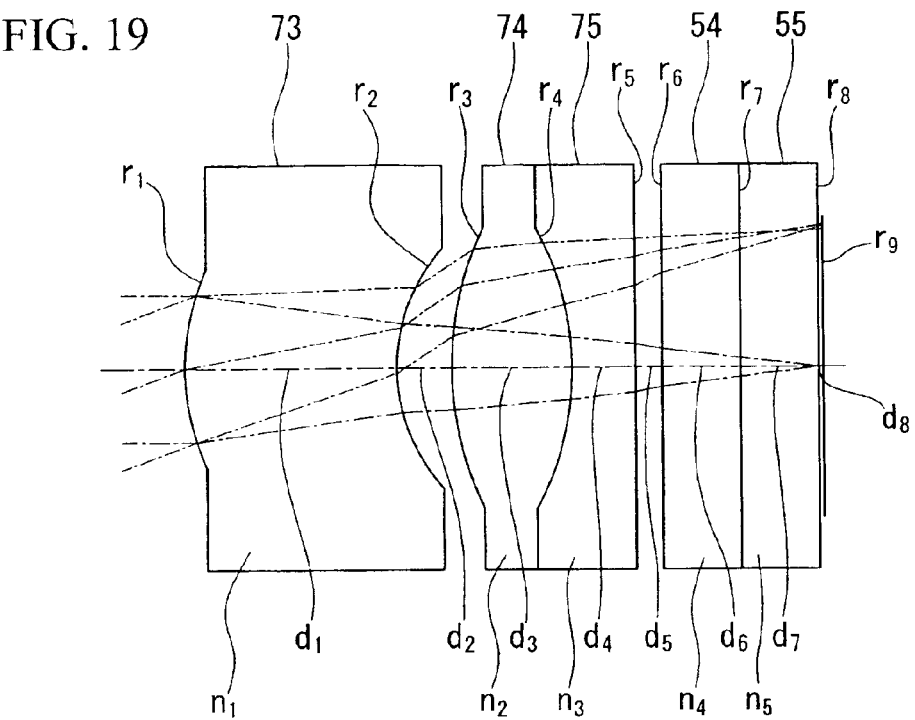
FIG. 19 shows an optical path in a sixth data example for an image pickup lens unit in the first embodiment according to the present invention.

In FIG. 19, an optical path according to a sixth numeral embodiment is shown. FIGS. 20A to 20C show aberrations according to the present embodiment. FIGS. 20A to 20C are described under the same condition as in FIGS. 9A to 9C; therefore, explanations for a horizontal axis and a vertical axis are omitted.

The present embodiment is provided with a first lens 73 having a positive power, a second lens 74 having a positive power, a third lens 75 having a negative power, and filter members 54, 55 in such an order from an object toward the image pickup lens unit. An optical surface of the second lens 74 and an optical surface of the third lens 75 are cemented together. An air interval is disposed between the first lens 73 and the second lens 75. Here, an aperture which is not shown in the drawing is formed on a side surface of the first lens 73 by performing a vapor deposition.

In the present embodiment, a polycarbonate resin member is used for the third lens 75.

The present embodiment is under condition that a focal distance is under defocused condition such as an objective distance So=960 mm. Diagonal perspective angle ω is 40°. Effective F number is under condition of F2.8. Image height is under condition of 1H=0.924 mm.

Also, the rest of the conditions are such that air surfaces are six surfaces, ST/TD=0.14, MT/TD=0.09, inclination angle=38°, and $|\phi/\phi_A|=0.20$. Curvature of image is corrected by disposing an air interval between the first lens 73 and the second lens 74.

| Surface | r | d | $n_d$ | $v_d$ |
|---|---|---|---|---|
| 1 | $r_1 = 1.53$ | $d_1 = 1.340$ | $n_1 = 1.8061$ | $v_1 = 40.9$ |
| 2 | $r_2 = 1.15$ | $d_2 = 0.35$ | | |
| 3 | $r_3 = 2.07$ | $d_3 = 0.77$ | $n_2 = 1.8061$ | $v_2 = 40.9$ |
| 4 | $r_4 = -1.88$ | $d_4 = 0.40$ | $n_3 = 1.5839$ | $v_3 = 30.2$ |
| 5 | $r_5 = \infty$ | $d_5 = 0.17$ | | |
| 6 | $r_6 = \infty$ | $d_6 = 0.50$ | $n_4 = 1.5163$ | $v_4 = 64.1$ |
| 7 | $r_7 = \infty$ | $d_7 = 0.50$ | $n_5 = 1.5163$ | $v_5 = 64.1$ |
| 8 | $r_8 = \infty$ | $d_8 = 0.03$ | | |
| 9 | $r_{10} = \infty$ (Image Surface) | | | |

As understood from FIGS. 20A to 20C, the image pickup lens unit according to the present embodiment has a preferable aberration correction in visible range of rays even through a lens made of a synthetic resin member such as a polycarbonate member having relatively a small refractive index is used. As explained above, according to the present embodiment, it is possible to produce a lens in a low cost by using a lens made of a polycarbonate member as a synthetic resin. Therefore, there is an advantage in that it is possible to manufacture an image pickup lens unit in low cost. Also, there is an advantage in that it is possible to dispose a positioning protruding section for forming an air interval easily by using a synthetic resin mold.

Embodiment 7

Figure 21:
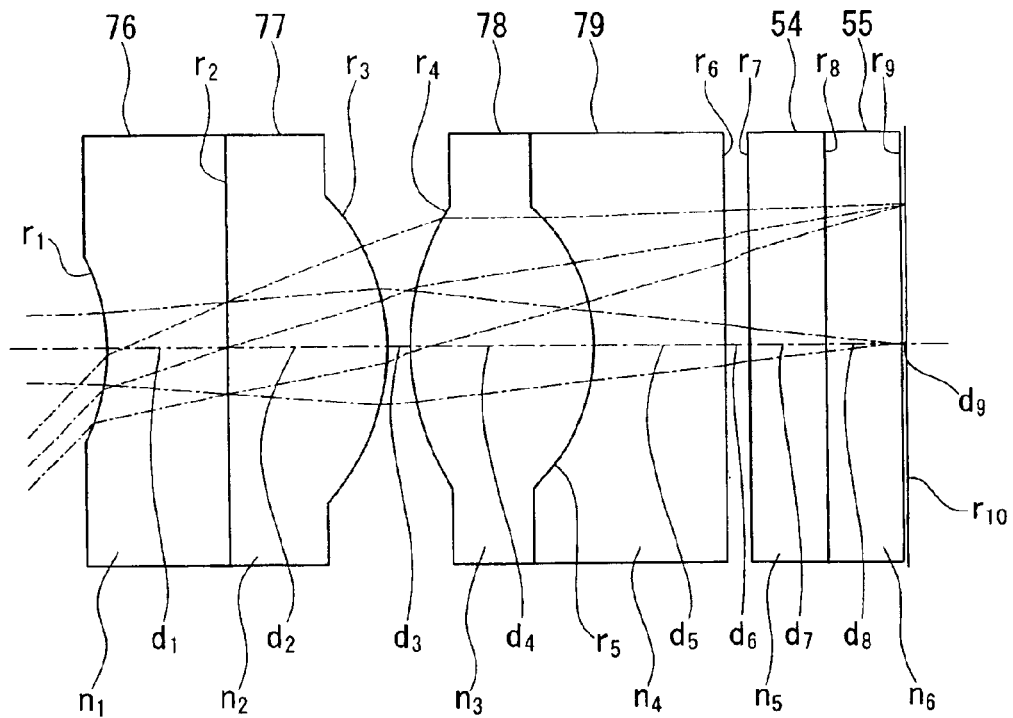
FIG. 21 shows an optical path in a seventh data example for an image pickup lens unit in the first embodiment according to the present invention.

In FIG. 21, an optical path according to a seventh numeral embodiment is shown. FIGS. 22A to 22C show aberrations according to the present embodiment. FIGS. 22A to 22C are described under the same condition as in FIGS. 9A to 9C; therefore, explanations for a horizontal axis and a vertical axis are omitted.

The present embodiment is provided with a first lens 76 having a negative power, a second lens 77 having a positive power, a third lens 78 having a positive power, a fourth lens 79 having a negative power, and filter members 54, 55 in such an order from an object toward the image pickup lens unit. An optical surface of the first lens 76 and an optical surface of the second lens 77 are cemented together. Also, an optical surface of the third lens 78 and an optical surface of the fourth lens 79 are cemented together. An air interval is disposed between the second lens 77 and the third lens 78. Here, an aperture which is not shown in the drawing is formed on an image surface of the first lens 76 by performing a vapor deposition.

In the present embodiment, a synthetic resin member such as a ZEONEX (registered Trademark) is used for the third lens 78. Also, a polycarbonate resin member is used for the fourth lens 79.

The present embodiment is under condition that a focal distance is under condition of objective distance: So=10 mm. Diagonal perspective angle ω is 90° Effective F number is under condition of F 3.0. Image height is under condition of 1H=0.924 mm.

Also, the rest of the conditions are such that air surfaces are six surfaces, ST/TD=0.07, MT/TD=0.03, inclination angle=46°, and $|\phi/\phi_A|=0.20$. Curvature of image is corrected by disposing an air interval between the second lens 77 and the third lens 78.

| Surface | r | d | $n_d$ | $v_d$ |
|---|---|---|---|---|
| 1 | $r_1 = -1.35$ | $d_1 = 0.78$ | $n_1 = 1.6889$ | $v_1 = 31.1$ |
| 2 | $r_2 = \infty$ | $d_2 = 1.02$ | $n_2 = 1.8061$ | $v_2 = 40.9$ |
| 3 | $r_3 = -1.49$ | $d_3 = 0.15$ | | |
| 4 | $r_4 = 1.72$ | $d_4 = 1.19$ | $n_3 = 1.5254$ | $v_3 = 56.2$ |
| 5 | $r_5 = -1.24$ | $d_5 = 0.85$ | $n_4 = 1.5839$ | $v_4 = 30.2$ |
| 6 | $r_6 = \infty$ | $d_6 = 0.16$ | | |
| 7 | $r_7 = \infty$ | $d_7 = 0.50$ | $n_5 = 1.5163$ | $v_5 = 64.1$ |
| 8 | $r_8 = \infty$ | $d_8 = 0.50$ | $n_6 = 1.5163$ | $v_6 = 64.1$ |
| 9 | $r_9 = \infty$ | $d_9 = 0.03$ | | |
| 10 | $r_{10} = \infty$ (Image Surface) | | | |

As understood from FIGS. 22A to 22C, the image pickup lens unit according to the present embodiment has a preferable aberration correction in visible range of rays even through two pairs of lens made of a synthetic resin member having relatively a small refractive index are used. In particular, according to FIG. 22A, it is understood that the chromatic aberration is more preferably corrected than in cases of the first embodiment and the second embodiment because two pairs of cemented lenses are used.

According to the present embodiment, there is an advantage in that it is possible to manufacture an image pickup lens unit in low cost because two lenses are made of synthetic resin member which are low cost among four lenses.

Embodiment 8

Figure 23:
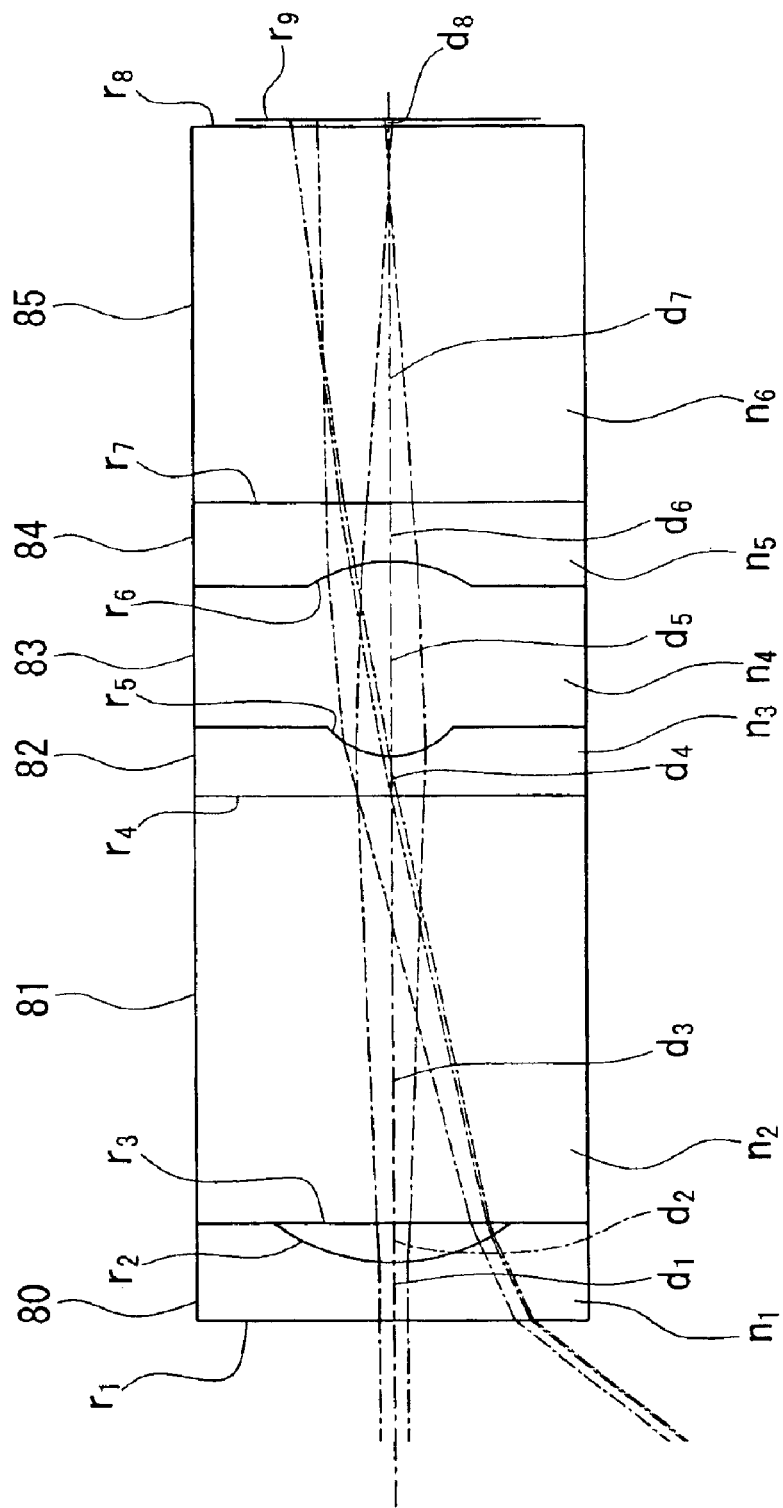
FIG. 23 shows an optical path in an eighth data example for an image pickup lens unit in the first embodiment according to the present invention.

In FIG. 23, an optical path according to an eighth numeral embodiment is shown. FIGS. 24A to 24C show aberrations according to the present embodiment. FIGS. 24A to 24C are described under the same condition as in FIGS. 9A to 9C; therefore, explanations for a horizontal axis and a vertical axis are omitted. In the present embodiment, the data per each wavelength does not disperse so wide that FIG. 24A shows results only for wavelengths such as 656.27 nm, 587.56 nm, and 486.13 nm.

The present embodiment is provided with a first lens 80 having a negative power, a parallel flat board 81, a second lens 82 having a negative power, a third lens 83 having a positive power, a fourth lens 84 having a negative power, and a fifth lens 85 having a positive power in such an order from an object toward the image pickup lens unit. An optical surface of the second lens 82 and an optical surface of the third lens 83 are cemented together. Also, an optical surface of the fourth lens 84 and an optical surface of the fifth lens 85 are cemented together. An air interval is disposed between a concave surface ($r_2$) of the first lens 80 and an a side surface ($r_3$) of the parallel flat board 81 toward an object. Here, an aperture which is not shown in the drawing is formed on a side surface of an image surface of the parallel flat board 81 by performing a vapor deposition.

The present embodiment is under condition that a focal distance is under condition of objective distance: So=∞. Diagonal perspective angle ω is 103' Effective F number is under condition of F 4.3. Image height is under condition of 1H=0.5 mm.

Also, the rest of the conditions are such that air surfaces are four surfaces, ST/TD=0.04, MT/TD=0.03, inclination angle=45°, and $|\phi/\phi_A|$=0.23. Curvature of image is corrected by disposing an air interval between the first lens 80 and the flat parallel board 81.

| Surface | r | d | $n_d$ | $v_d$ |
|---|---|---|---|---|
| 1 | $r_1 = \infty$ | $d_1 = 0.30$ | $n_1 = 1.8830$ | $v_1 = 40.7$ |
| 2 | $r_2 = 1.02$ | $d_2 = 0.20$ | | |
| 3 | $r_3 = \infty$ | $d_3 = 2.20$ | $n_2 = 1.5927$ | $v_2 = 35.3$ |
| 4 | $r_4 = \infty$ | $d_4 = 0.20$ | $n_3 = 1.5927$ | $v_3 = 35.3$ |
| 5 | $r_5 = 0.42$ | $d_5 = 1.00$ | $n_4 = 1.8830$ | $v_4 = 40.7$ |
| 6 | $r_6 = -0.76$ | $d_6 = 0.30$ | $n_5 = 1.5927$ | $v_5 = 35.3$ |
| 7 | $r_7 = 57.74$ | $d_7 = 1.93$ | $n_6 = 1.8830$ | $v_6 = 40.7$ |
| 8 | $r_8 = \infty$ | $d_8 = 0.03$ | | |
| 9 | $r_9 = \infty$ (Image Surface) | | | |

As understood from FIGS. 24A to 24C, the image pickup lens unit according to the present embodiment has a preferable aberration correction in visible range of rays.

In the present embodiment, an air lens is formed by disposing an air interval between the first lens 80 having a power and the parallel flat board 81 not having a power.

Figure 25:
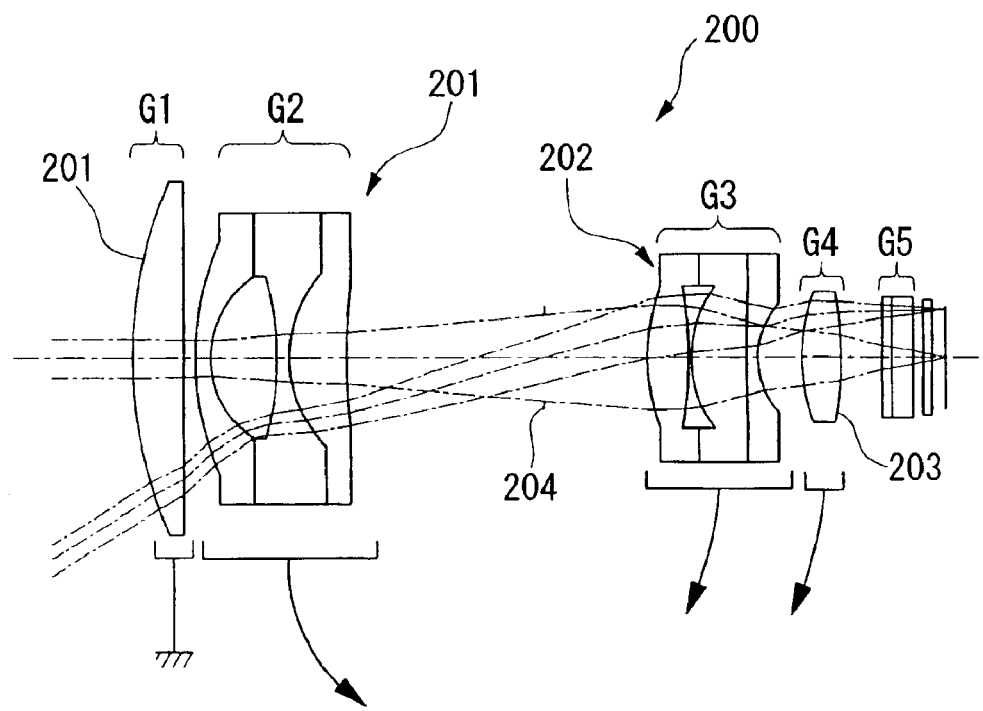
FIG. 25 shows a general structure for an optical system of a zoom lens as an example of an image pickup device according to the second embodiment in the present invention.

FIG. 25 shows a general structure for an optical system of a zoom lens according to the present embodiment as an example of an image pickup device.

A zoom lens 200 is provided with a first group G1 having a positive power, a second group G2 having a negative power, a third group G3 having a positive power, a fourth group G4 having a positive power, and a fifth group G5 including a filter member and the like in such an order from an object toward the image pickup lens unit. These groups are cemented to a lens barrel which is not shown in the drawing. The second group G2, the third group G3, the fourth group G4, and the fifth group G5 are retained so as to freely move with respect to the first group G1.

The second group G2 and the third group G3 which can move freely are formed by the image pickup lens units 201 and 202 according to the first embodiment of the present invention. In the image pickup lens units 201 and 202, three lenses do not use the lens cylinder, and the lenses neighboring in the optical axis direction are cemented together. In addition, an air interval and an cementing surface are formed therein. Next, FIGS. 26A to 26C are cross sections in an optical axis direction for showing a general structure of an image pickup unit 900 according to the present embodiment of the present invention.

As shown in FIG. 26A, the image pickup lens unit 900 is provided with an image pickup lens unit 150 and an image pickup elements 901.

In the present embodiment, the image pickup lens unit 150 is formed unitarily by three lenses which are cemented together at the flange sections. All the image pickup lens units according to the first embodiment of the present invention can be used for the image pickup lens unit 150 in the present embodiment.

The image pickup elements 901 has a CCD (charge-coupled device) which is a photoelectric converting device which is formed on a semiconductor wafer and a micro lens 903. In addition, a micro lens array 903 is formed on a surface for receiving a light on the CCD 902.

The image pickup lens unit 150 and a cover glass 904 are cemented and fixed by a bonding agent 906 via a spacer 905.

The spacer 905 can adjust a position and inclination of the image pickup lens unit 150 and an interval with the cover glass 904 by a wedge shape of the spacer 905.

In FIG. 26B, other example for an image pickup lens unit 900' is shown. The image pickup lens unit 900' uses other image pickup lens unit 151 instead of the image pickup lens unit 150. The image pickup lens unit 151 is provided with a plurality of positioning protruding sections 151a on flange sections on the optical element which is disposed in the nearest position to the image pickup lens unit. The space 905 is omitted by the positioning protruding sections 151a. Also, the image pickup lens unit 900' is provided with a CCD 902 and a micro lens array 903 instead of the image pickup elements 901. Also, the image pickup lens unit 900' is provided with an image pickup elements 901 which does not have the cover glass 904.

In FIG. 26C, other example for an image pickup lens unit 900" is shown. The image pickup lens unit 900" uses other image pickup lens unit 152 which is provided with a positioning protruding section 152a on a flange section of the optical element which is disposed in the nearest position to the image pickup lens unit and an image pickup elements 9. Also, an outer peripheral section of the CCD 902 is disposed in array on the flange side surface 152c (side surface).

Such a structure can be manufactured easily by cementing the image pickup lens unit 152 and the optical element arrays together and cutting the cemented image pickup lens unit and the optical element array. That is, such a structure can be manufactured by positioning the cemented optical element array on a semiconductor wafer which is formed in which the CCD 902 is disposed in an array manner, cementing the positioning protruding section 152a on the semiconductor wafer by a bonding agent 906, and cutting the optical element array and the semiconductor wafer simultaneously.

A specific example for an image pickup device according to the present embodiment using the image pickup lens unit 900 is explained as follows.

Figure 27:
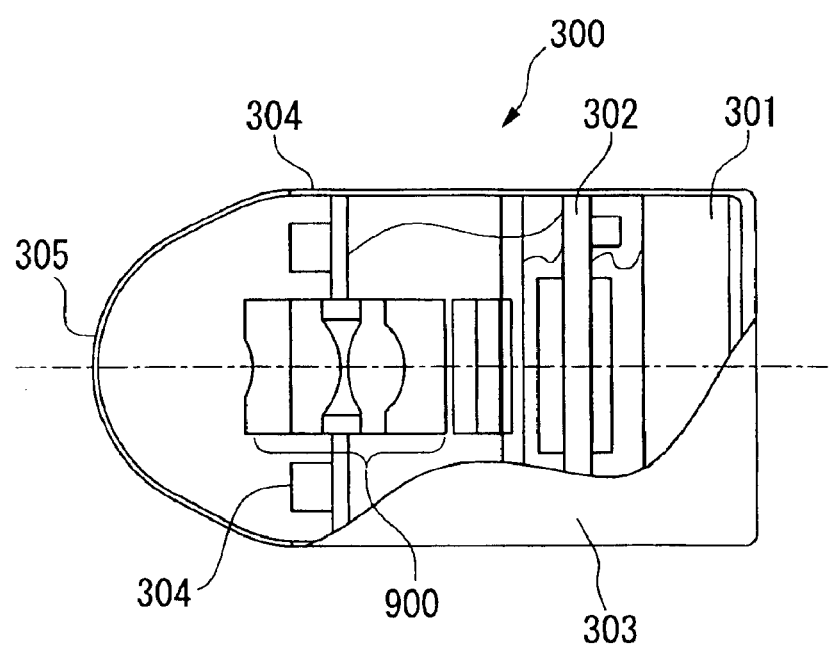
FIG. 27 is a cross section for explaining a general structure of a capsule endoscope which uses the image pickup unit according to the present invention.

In FIG. 27, an example in which the image pickup lens unit 900 is used for a capsule endoscope 300 is shown.

The capsule endoscope 300 is provided with a light source 304, an image pickup lens unit 900, an image processing circuit 302 for processing a signal which is sent from the image pickup lens unit 900, a battery 301 for supplying a power to the above members. Entire capsule endoscope 300 is covered by a cover 303. A transparent window is disposed at a tip of the cover 303. A light is emitted via the transparent window 305. Also, a reflected light is received by the image pickup lens unit 900 via the transparent window 305.

Figure 28A:
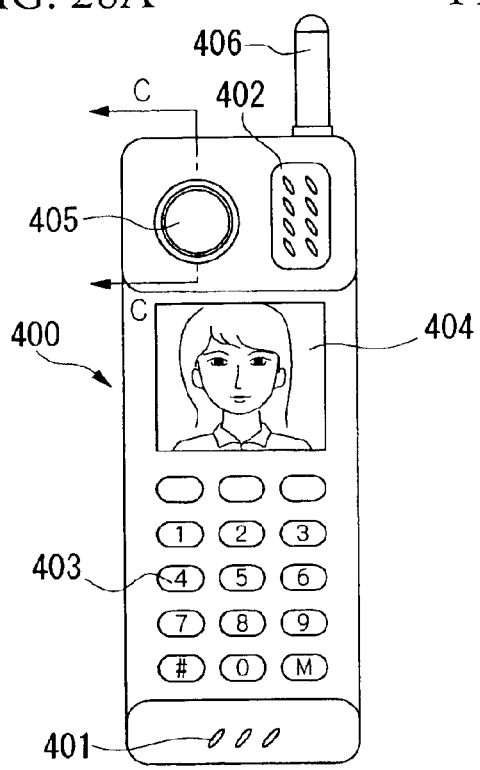
FIG. 28A is a front view for showing a general structure for a mobile terminal which uses the image pickup unit according to the present invention.
Figure 28B:
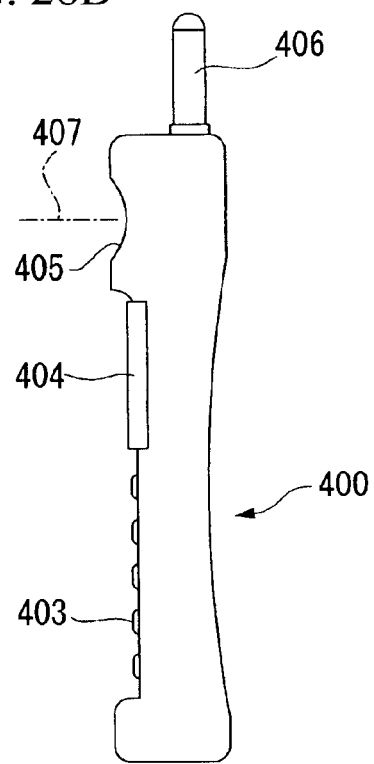
FIG. 28B is a side view therefor.
Figure 28C:
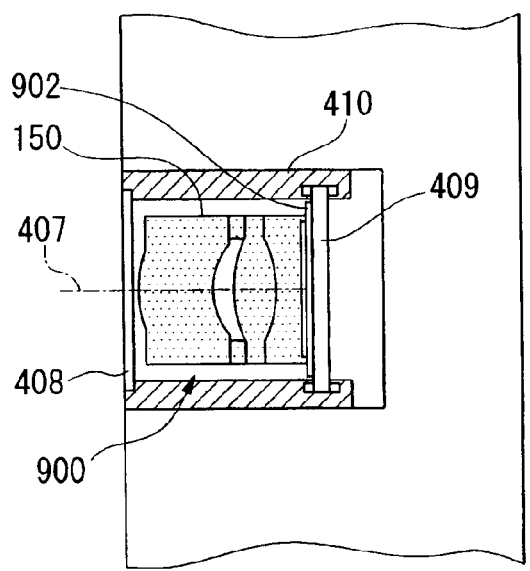
FIG. 28C is a cross section therefor.

Next, in FIGS. 28A to 28C, an example in which the image pickup lens unit 900 is used for a mobile terminal 400 is shown. FIG. 28A is a front view. FIG. 28B is a side view. FIG. 28C is a cross section viewed in line C—C shown in FIG. 28A.

The mobile terminal 400 is provided with an image pickup section 405 in which the image pickup lens unit 900 is used, a monitor section 404, input section 403 for inputting a character and a signal by using buttons and dials, a microphone section 401, a speaker section 402, and an antenna for transmitting and receiving a wireless communication information.

As shown in FIG. 28C, a CCD 902 which is included in the image pickup lens unit 900 is fixed and connected to a circuit board 409 which is fixed on a base board cementing section 410 inside of the mobile terminal 400. Also, a cover glass 405 is disposed in a direction toward an image pickup section optical axis 407 so as to be sealed thereinside.

Figure 29:
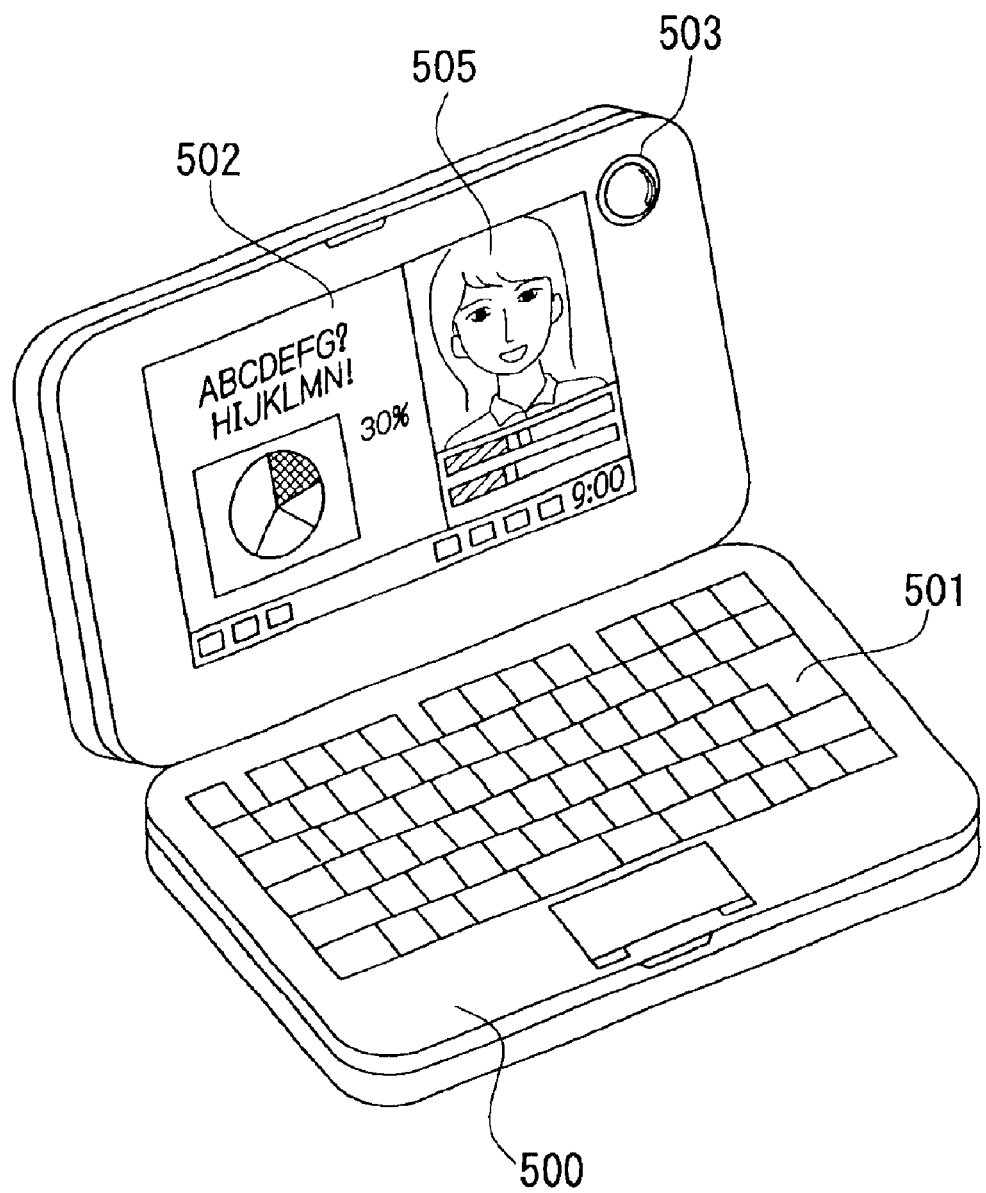
FIG. 29 is a perspective view for showing a general structure of a personal computer which uses the image pickup unit according to the present invention.

Next, in FIG. 29, an example in which the image pickup lens unit 900 is used for a personal computer 500 is shown. FIG. 29 is a perspective view for showing a general structure of a personal computer 500.

A personal computer 500 is provided with a keyboard 501, a monitor section 502 and an image pickup section 503. The monitor section 502 can display an image 505 including images which are picked up by the image pickup section 503. The image pickup section 503 is disposed next to the monitor section 502. The image pickup lens unit 900 (not shown in the drawing) is disposed inside of the image pickup section 503. A structure of the image pickup unit 900 in cross section in the optical axis direction has the same structure shown in FIG. 28C.

Figure 30:
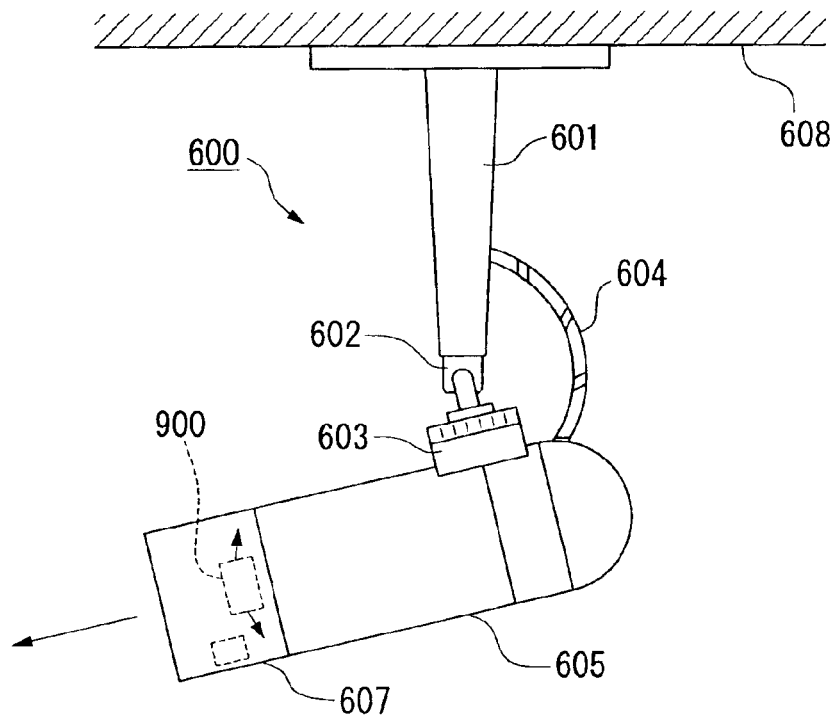
FIG. 30 is a side view for showing a general structure for a monitoring camera which uses the image pickup unit according to the present invention.

Next, in FIG. 30, an example in which the image pickup lens unit 900 is used for a monitoring camera 600 is shown. FIG. 29 is a side view for showing a general structure for a monitoring camera 600.

The monitoring camera 600 is provided with a circuit section 605 and an image pickup section 607 for forming a monitoring camera unit. The monitoring camera 600 is cemented on an cementing section 601 which is fixed on a ceiling 608 via a shaft 602 and a motor 603. The image pickup lens unit 900 is disposed inside of the image pickup section 697 so as to pick up the image in a direction of an arrow shown in the drawing. A structure of the image pickup unit 900 in cross section in the optical axis direction has the same structure shown in FIG. 28C. The image pickup lens unit 900 is fixed inside of the image pickup section 607. It may be acceptable that the base board cementing section 410 (see FIG. 28C) is cemented so as to freely swing by a rotating structure which is not shown in the drawing.

Figure 31:
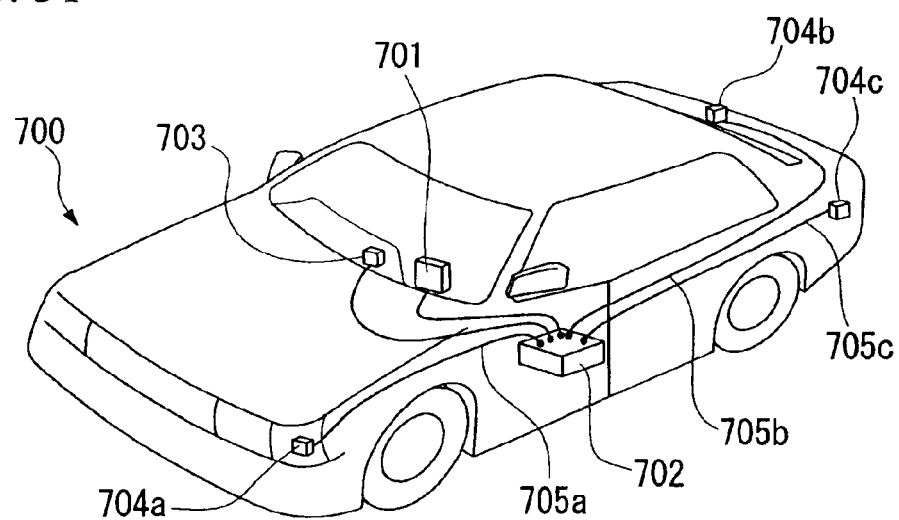
FIG. 31 is a perspective view for showing a general structure of a camera system for an automobile which uses the image pickup unit according to the present invention.

Next, in FIG. 31, an example in which the image pickup lens unit 900 is used for a monitoring system 700 for an automobile is shown. FIG. 31 is a perspective view for showing a general structure of a camera system 700 for an automobile. The monitoring system 700 for an automobile is provided with image pickup sections 704a, 704b, and 704c. The monitoring system 700 for an automobile can display an image in a monitor section 701 which is picked up by the image pickup sections via a signal processing section 702 and a switching controlling section 703. The image pickup sections 704a, 704b, and 704c are connected by optical fibers 705a, 705b, and 705c respectively.

A structure of the image pickup unit 900 in cross section in the optical axis direction has the same structure shown in FIG. 28C. The image pickup lens unit 900 is fixed inside of the image pickup sections 704a, 704b, and 704c.

Any of the image pickup device according to the present embodiment as explained above uses the image pickup lens unit according to the first embodiment of the present invention; therefore, it is possible to realize an equivalent effect and advantage as in the image pickup lens unit 900 according to the first embodiment.

In particular, in the zoom lens 200, the lens groups such as the second group G2 and the third group G3 are unitarily formed without using a lens barrel; therefore, it is possible to realize a light-weight, small zoom lens.

Also, it is possible to form the image pickup lens unit 900 unitarily with the CCD 902 by a manufacturing method in which members for forming the optical elements are cemented together; therefore, there is an advantage in that the manufacturing process becomes efficient because the manufacturing processes are continuous. Furthermore, by using a method in which the optical elements are cemented together and cut while maintaining the array disposition, there are further advantages in that the production efficiency improves and it is possible to realize a mass-production of a small image pickup lens unit.

As explained above, by the image pickup lens unit according to the present invention, there is an advantage in that it is possible to provide a small image pickup lens unit in a low cost while improving a performance in the optical system by providing an air intervals and forming the optical elements unitarily without forming a lens barrel structure by a mirror cylinder member.

Also, the image pickup lens unit according to the present invention is used in the image pickup device according to the present invention; therefore, there is an effect equivalent to the effect which is realized by the image pickup lens unit according to the present invention.

According to the first aspect of the present invention, a cylindrical frame member or a cylindrical structure are not provided. Also, an air interval is formed, and an optical system is formed unitarily. Therefore, there is an effect that it is possible to provide an image pickup lens unit having a compact size in cheaper cost.

Also, in the image pickup device according to the present invention, an image pickup lens unit according to the present invention is used; therefore, it is possible to realize an equivalent effect as realized in the image pickup lens unit according to the present invention.

In the first aspect of the present invention, an image pickup lens unit comprises at least three optical elements having at least an air interval for forming an air lens. Also, the optical elements are formed unitarily wherein the optical elements are cemented mutually between the other optical elements which neighbors in an optical axis or between sandwiching members which are disposed between the other optical elements. Therefore, there is an effect that the image pickup lens unit is formed unitarily.

According to the present invention, an air interval for forming an air lens is provided in the optical system. Therefore, it is possible to realize a larger power by making use of a refractive index difference on an air surface; thus, it is possible to correct a distortion in a picked-up image.

Also, the optical elements are cemented mutually between the other optical elements which neighbors in an optical axis or between sandwiching members which are disposed between the other optical elements. Therefore, a cylindrical frame member for supporting the optical elements is not necessary. Also, a cylindrical structure for supporting the cylindrical frame member which is formed so as to expand in the optical axis direction is not necessary. By doing this, according to the present invention, it is possible to form the optical element unitarily without the cylindrical frame member and the cylindrical structure.

In a second aspect of the present invention, side surfaces of the optical elements are aligned in a surface which expands in the optical direction.

According to the present invention, side surfaces of the optical elements are aligned in a surface which expands in the optical direction; thus, a certain area which is sufficient for cementing other members is provided on the image pickup lens unit. Therefore, the image pickup lens unit can be cemented and contained in an image pickup device stably and easily without using the cylindrical frame member or a cylindrical structure.

Also, it is possible to cover side surfaces of the optical element by a non-expandable sheet. As a result, it is possible to cover the side surfaces of the optical element by a non-expandable, light-shielding sheet which is cheep and easy to attach thereto so as to shield the side surfaces of the optical element.

According to a third aspect of the present invention, there is an effect which can be realized by a structure that condition such as $ST/TD<0.7$ and $MT/TD<0.5$ are effective under condition that an interval between a first surface in an optical system in which the optical elements are cemented and a last surface in the optical system is defined as a TD, a total length of the air interval in the optical axis is defined as an ST, and a maximum length of the air interval in the optical axis is defined as an MT.

According to the present invention, the above relationships are satisfied; therefore, it is possible to reduce inaccuracies of the alignment in the optical elements caused by a too large air intervals when the optical elements are cemented together. Therefore, it is possible to assemble the image pickup lens unit very accurately.

Also, when a member such as a protrusion is formed on each optical element so as to limit the intervals along the optical surfaces, it is possible to control a thickness in an optical axis direction in the protrusion. Therefore, it is possible to mold each optical element; thus, it is possible to improve the accuracy in dimension in the optical system.

Here, it is preferable that the air intervals in an overall optical system should be as small as possible so as to realize an easy-to-assemble, cheap optical systems unless the performance in the overall optical system is deteriorated. For that purpose, in the image pickup lens unit according to the present invention, relationships such as $ST/TD<0.6$ and $MT/TD<0.4$ are satisfied. Furthermore, it is more preferable that relationships such as $ST/TD<0.5$ and $MT/TD<0.3$ are satisfied.

In a fourth aspect of the present invention, the surfaces of the optical elements except optical surfaces are provided with a light absorbing member.

According to the present invention, all reflected light except on the optical surfaces are absorbed; therefore, it is possible to restrict a flaring and a ghost image. As a result, there is an effect for improving an image quality.

In a fifth aspect of the present invention, a maximum of an inclination angle θ is not more obtuse than 60 degrees on each optical surface in the optical elements under condition that an angle between an optical axis in an optical surface in the optical element and a normal in an effective diameter in the optical surface is defined as an inclination angle θ.

According to the present invention, the above relationship is satisfied. Therefore, there is an effect in that it is possible to measure a shape of an optical surface in the optical element easily by a contacting shape measuring device such as a FORM TALYSURF. That is, it is possible to know the inaccuracies in each optical element directly; therefore, it is possible to determine whether or not a product is defect. Also, it is possible to perform the measurement quickly; therefore, it is possible to shorten a time for an inspection; therefore, it is possible to shorten a time for manufacturing the optical system.

Also, a probe in the measuring device can contact an optical surface more orthogonally when an inclination angle θ is smaller. Therefore, it is possible to reduce inaccuracies in a peripheral section in the measurement, therefore, there is an effect in that it is possible to perform more precise measurement.

From that point of view, it is preferable that the maximum of the inclination angle θ is not larger than 55 degrees. Furthermore, more preferably, the maximum of the inclination angle θ is not larger than 50 degrees.

According to a sixth aspect of the present invention, the optical elements form an cemented lens in which at least optical surfaces of a pair of the optical elements are cemented together.

In the present invention, there is an effect in that it is possible to correct the chromatic aberration by cementing the optical elements having different refractive index differences by cementing the lenses together. Therefore, there is an effect in that it is possible to provide a more superior image pickup lens unit.

Also, by cementing lenses together, it is possible to reduce a reflection on a surface which causes a stray light such as a ghost image and a flaring.

According to a seventh aspect of the present invention, a relationship such as $0<|\phi/\phi_A|<0.5$ is effective under condition that a maximum power in an cemented surface of the lens is defined as φ, and a power of the optical element which is formed unitarily in an overall optical system is defined as $\phi_A$.

Here, |a| indicates an absolute value of "a".

In the present invention, the above relationship is satisfied; therefore, there is not a case in which a power in the optical elements which form the cemented surfaces is not excessive. Therefore, it is possible to prevent the chromatic aberration and the curvature of image which are corrected on the surfaces of lenses which are cemented together from worsening rapidly due to an inaccurate alignment caused in a manufacturing process. That is, it is possible to improve the productivity.

Here, sensitivity for the inaccurate alignment decreases under condition that a curvature diameter in surfaces of the lenses which are cemented together is larger. Therefore, it is possible to realize a more preferable effect if a relationship such as $$0<|\phi/\phi_A|<0.4$$

is satisfied. Furthermore, more preferable effect can be realized if a relationship such as $$0<|\phi/\phi_A|<0.3$$

is satisfied.

According to an eighth aspect of the present invention, an optical filter member is cemented to the optical element.

According to the present invention, it is possible to form an optical filber member with the image pickup lens unit unitarily; therefore, it is possible to improve the function of the image pickup lens unit in a compact size. Also, it is possible to cement the optical filter members together similarly to a case of the other optical elements; therefore, there is an effect for simplifying the manufacturing process; thus, the productivity can be improved.

According to a ninth aspect of the present invention, an image pickup device is provided with the image pickup lens unit according to the present invention.

In the present invention, there is the same effect as realized in any one of the above aspects.

In a tenth aspect of the present invention, an image pickup element is cemented to the image pickup lens unit.

According to the present invention, an image pickup element is cemented to the image pickup lens unit; therefore, there is an effect in that it is possible to cement the image pickup lens unit to the image pickup element without providing a member for supporting the image pickup lens unit. Therefore, there is an effect in that it is possible to reduce a manufacturing cost.

Also, there is an effect in that it is possible to improve the positioning accuracy of the optical element to the image pickup element.

What is claimed is:

1. An image pickup lens unit comprising at least three optical elements having at least an air interval for forming an air lens wherein the optical elements are formed unitarily and wherein the optical elements are cemented mutually between the other optical elements which neighbors in an optical axis or with a sandwiching members which is cemented with the other optical elements, and conditions such as ST/TD<0.5 are effective under the condition that an interval between a first surface in an optical system in which the optical elements are cemented and a last surface in the optical system is defined as a TD, a total length of the air interval in the optical axis is defined as an ST, and a maximum length of the air interval in the optical axis is defined as an MT.

2. An image pickup lens unit comprising at least three optical elements having at least an air interval for forming an air lens wherein the optical elements are formed unitarily and wherein the optical elements are cemented mutually between the other optical elements which neighbors in an optical axis or with a sandwiching members which is cemented with the other optical elements, wherein the optical elements form a cemented lens in which at least optical surfaces of a pair of the optical elements are cemented together, and a relationship such as $$0<|\phi/\phi_A|<0.5$$

is effective under condition that a maximum power in an cemented surface of the lens is defined as $\phi$, and a power of the optical element which is formed unitarily in an overall optical system as defined as $\phi_A$.

3. An image pickup lens unit according to claim 1 wherein an optical filter member is cemented to the optical element.

4. An image pickup device which is provided with the image pickup lens unit according to claim 1.

5. An image pickup device which is provided with the image pickup lens unit according to claim 1.

6. An image pickup device which is provided with the image pickup lens unit according to claim 2.

7. An image pickup device according to claim 5, wherein an image pickup element is cemented to the image pickup lens unit.

* * * * *